(12) United States Patent
Amano

(10) Patent No.: US 8,223,435 B2
(45) Date of Patent: Jul. 17, 2012

(54) ZOOM LENS FOR PROJECTION AND PROJECTION-TYPE DISPLAY DEVICE

(75) Inventor: Masaru Amano, Saitama (JP)

(73) Assignee: Fujifilm Corporation, Tokyo (JP)

( * ) Notice: Subject to any disclaimer, the term of this patent is extended or adjusted under 35 U.S.C. 154(b) by 118 days.

(21) Appl. No.: 12/939,551

(22) Filed: Nov. 4, 2010

(65) Prior Publication Data
US 2011/0109976 A1    May 12, 2011

(30) Foreign Application Priority Data

Nov. 9, 2009  (JP) .................................. 2009-256589

(51) Int. Cl.
G02B 9/00      (2006.01)
G02B 15/14     (2006.01)

(52) U.S. Cl. ........................................ 359/649; 359/676

(58) Field of Classification Search .......... 359/649–651, 359/676, 683
See application file for complete search history.

(56) References Cited

U.S. PATENT DOCUMENTS
7,545,578 B2 *  6/2009  Sugita ........................... 359/680

FOREIGN PATENT DOCUMENTS
JP        2005-106948        4/2005

* cited by examiner

*Primary Examiner* — William Choi
(74) *Attorney, Agent, or Firm* — Young & Thompson

(57) ABSTRACT

In a zoom lens for projection, a lens group arranged farthest to the reduction side is fixed when the magnification of the zoom lens is changed, and is composed of a negative aspheric lens made of a plastic material having at least one aspheric surface and a positive lens. At least one positive lens arranged on the reduction side of a lens having the smallest effective diameter among lenses composing the zoom lens satisfies the following formula (1):

$$\nu a > 80 (\text{here}, (dn/dt) < 0) \quad (1),$$

where $\nu a$: Abbe number of a material forming the at least one positive lens for d-line, and $dn/dt$: a change in the refractive index of the material forming the at least one positive lens for d-line when temperature changes from 20° C.

8 Claims, 14 Drawing Sheets

EXAMPLE 1
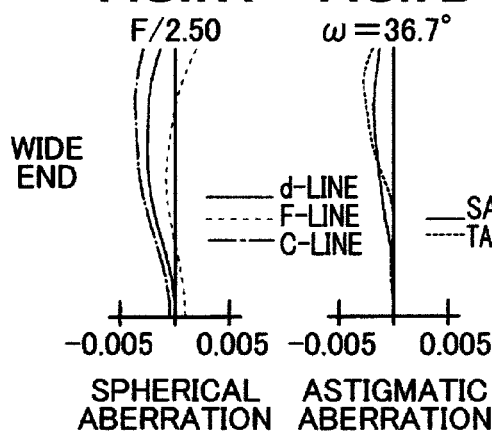
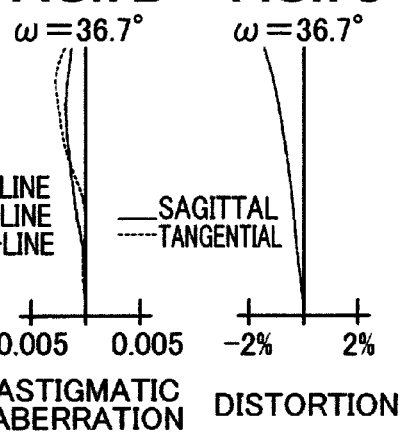
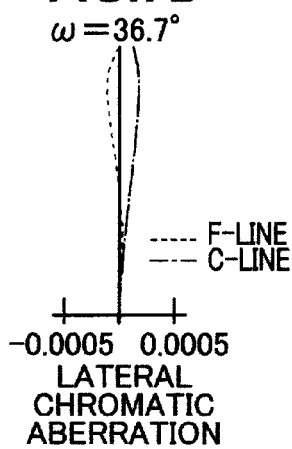
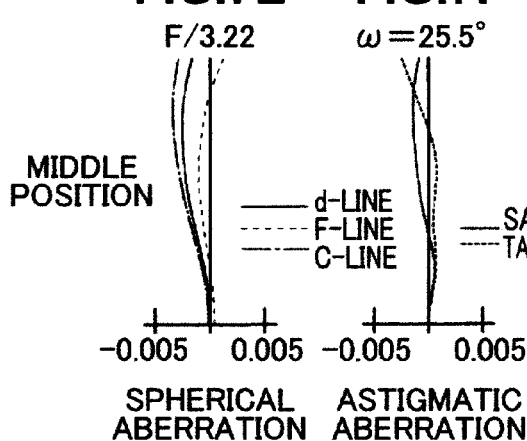
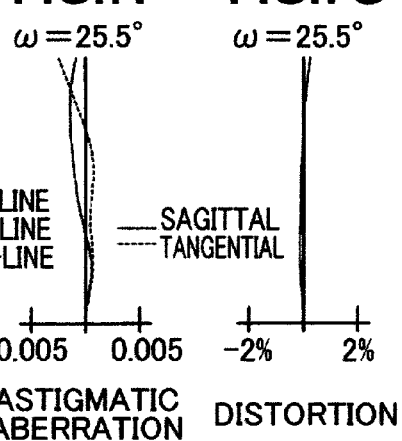
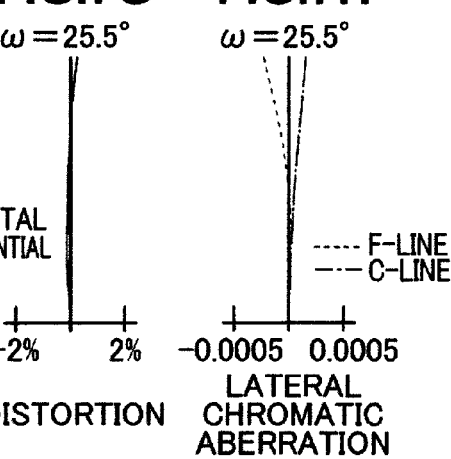
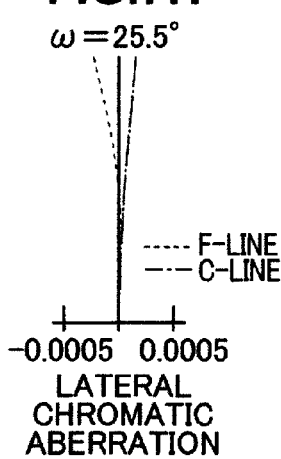
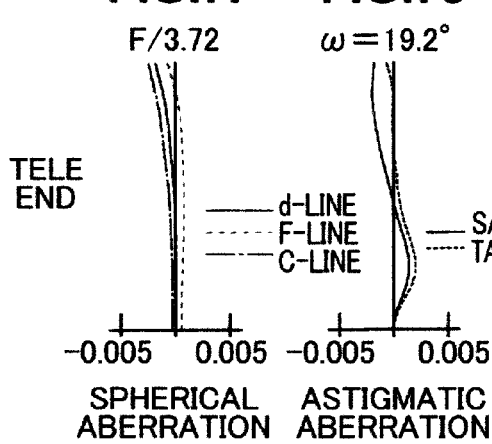
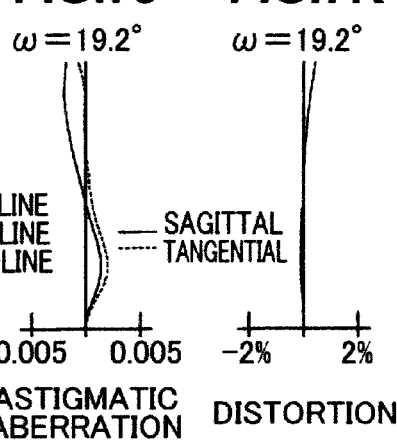
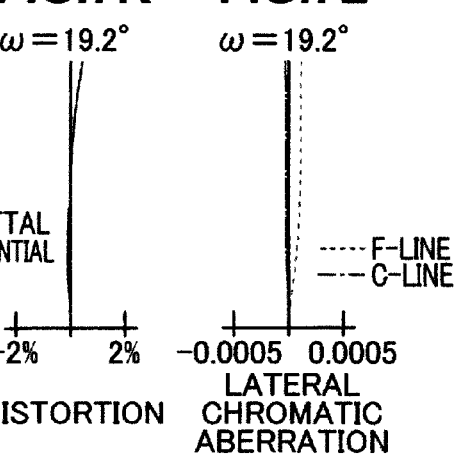
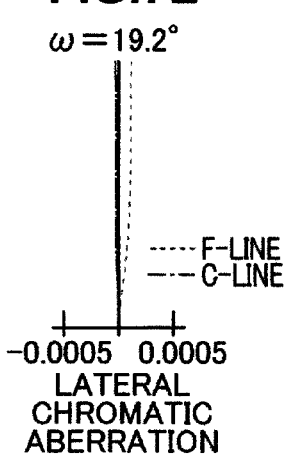

EXAMPLE 2

FIG.8A F/2.50 — WIDE END — SPHERICAL ABERRATION (d-LINE, F-LINE, C-LINE); −0.005 to 0.005

FIG.8B ω=39.3° — ASTIGMATIC ABERRATION (SAGITTAL, TANGENTIAL); −0.005 to 0.005

FIG.8C ω=39.3° — DISTORTION; −2% to 2%

FIG.8D ω=39.3° — LATERAL CHROMATIC ABERRATION (F-LINE, C-LINE); −0.0005 to 0.0005

FIG.8E F/3.37 — MIDDLE POSITION — SPHERICAL ABERRATION (d-LINE, F-LINE, C-LINE); −0.005 to 0.005

FIG.8F ω=26.8° — ASTIGMATIC ABERRATION (SAGITTAL, TANGENTIAL); −0.005 to 0.005

FIG.8G ω=26.8° — DISTORTION; −2% to 2%

FIG.8H ω=26.8° — LATERAL CHROMATIC ABERRATION (F-LINE, C-LINE); −0.0005 to 0.0005

FIG.8I F/3.80 — TELE END — SPHERICAL ABERRATION (d-LINE, F-LINE, C-LINE); −0.005 to 0.005

FIG.8J ω=19.3° — ASTIGMATIC ABERRATION (SAGITTAL, TANGENTIAL); −0.005 to 0.005

FIG.8K ω=19.3° — DISTORTION; −2% to 2%

FIG.8L ω=19.3° — LATERAL CHROMATIC ABERRATION (F-LINE, C-LINE); −0.0005 to 0.0005

EXAMPLE 3

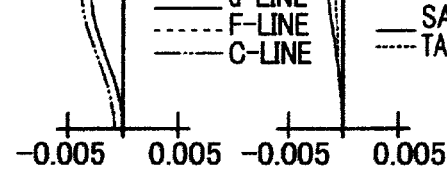

FIG.9A F/2.50 — WIDE END — SPHERICAL ABERRATION (d-LINE, F-LINE, C-LINE)
FIG.9B ω=37.0° — ASTIGMATIC ABERRATION (SAGITTAL, TANGENTIAL)
FIG.9C ω=37.0° — DISTORTION
FIG.9D ω=37.0° — LATERAL CHROMATIC ABERRATION (F-LINE, C-LINE)

FIG.9E F/3.30 — MIDDLE POSITION — SPHERICAL ABERRATION (d-LINE, F-LINE, C-LINE)
FIG.9F ω=25.8° — ASTIGMATIC ABERRATION (SAGITTAL, TANGENTIAL)
FIG.9G ω=25.8° — DISTORTION
FIG.9H ω=25.8° — LATERAL CHROMATIC ABERRATION (F-LINE, C-LINE)

FIG.9I F/3.66 — TELE END — SPHERICAL ABERRATION (d-LINE, F-LINE, C-LINE)
FIG.9J ω=19.4° — ASTIGMATIC ABERRATION (SAGITTAL, TANGENTIAL)
FIG.9K ω=19.4° — DISTORTION
FIG.9L ω=19.4° — LATERAL CHROMATIC ABERRATION (F-LINE, C-LINE)

EXAMPLE 4
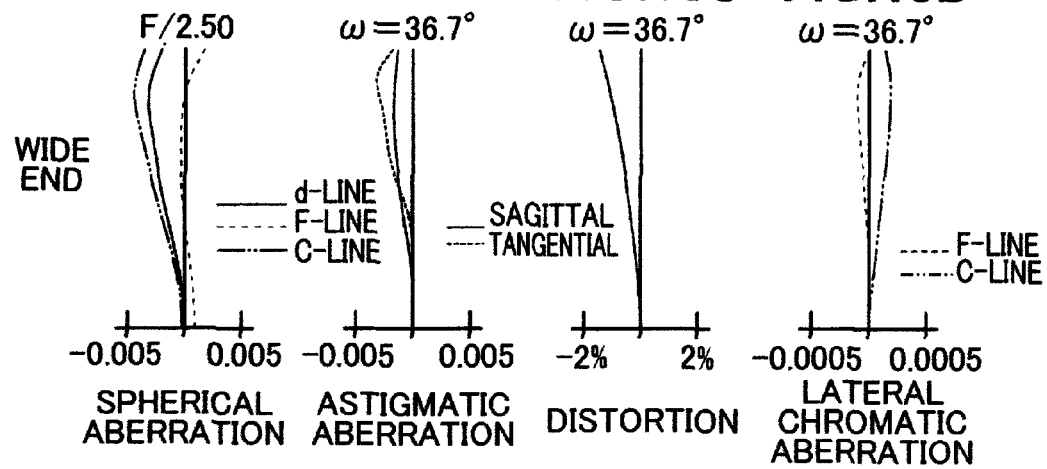
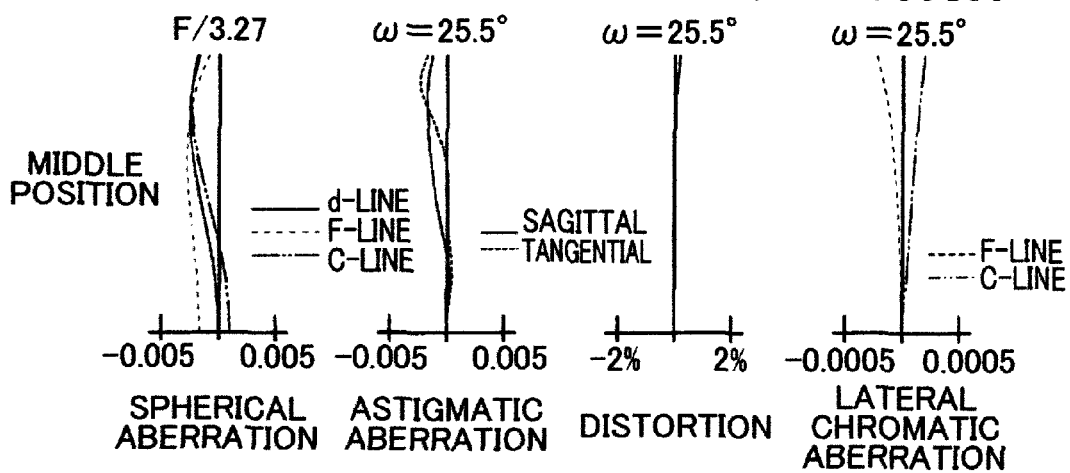
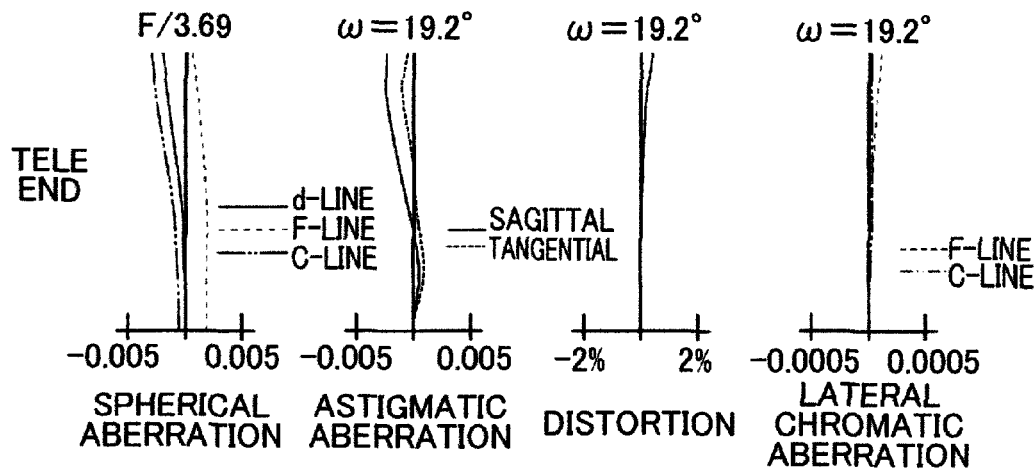

EXAMPLE 5
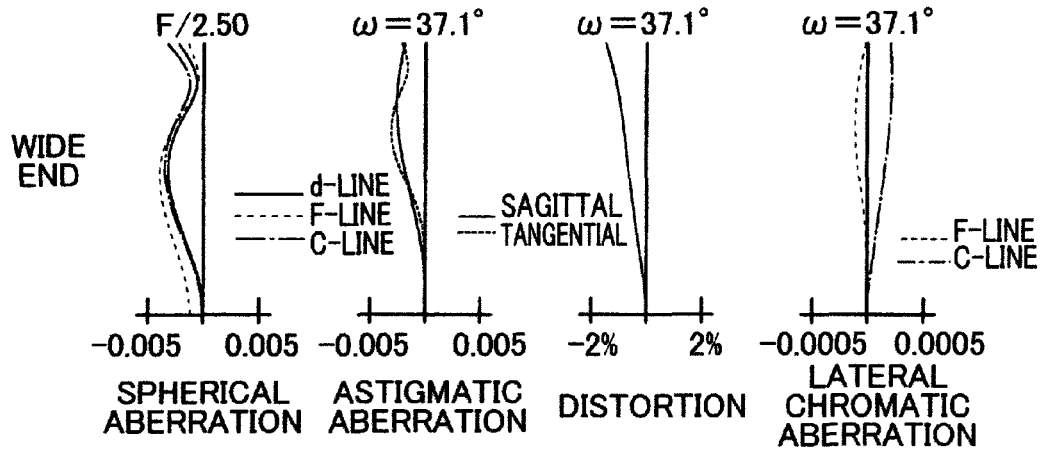
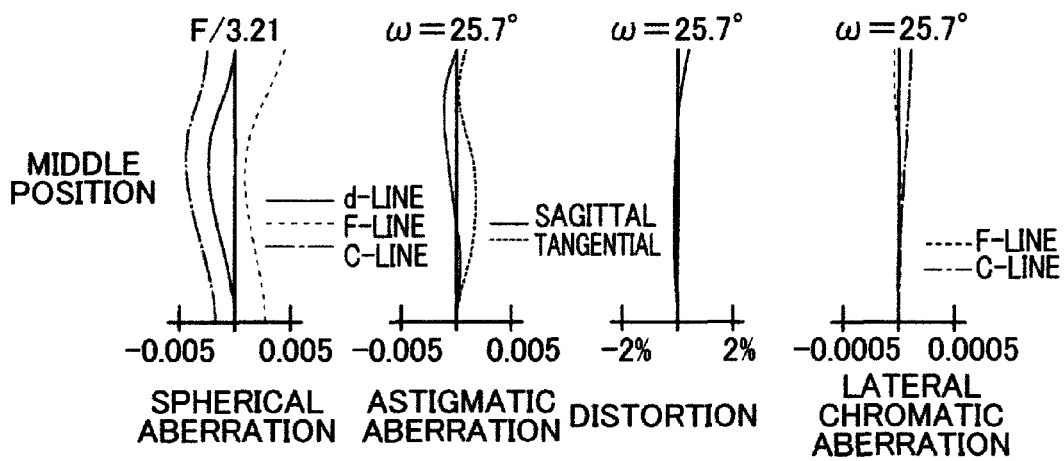
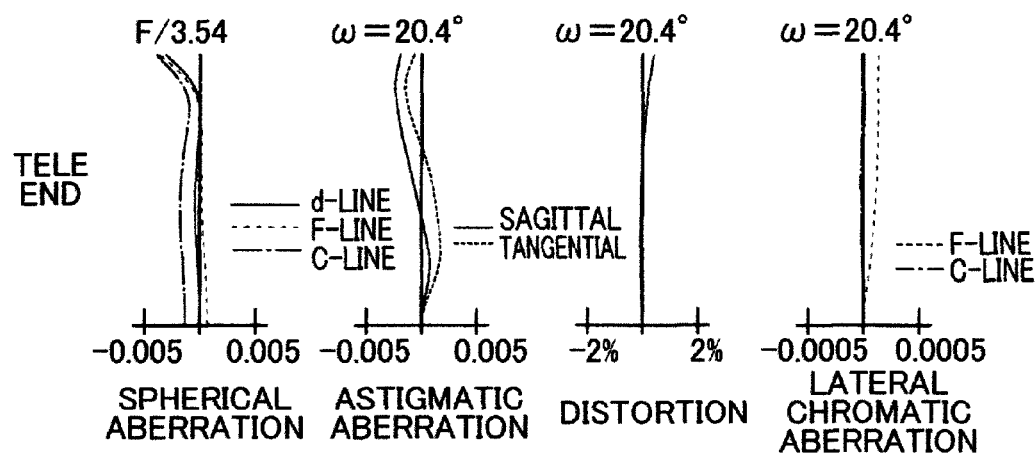

EXAMPLE 6
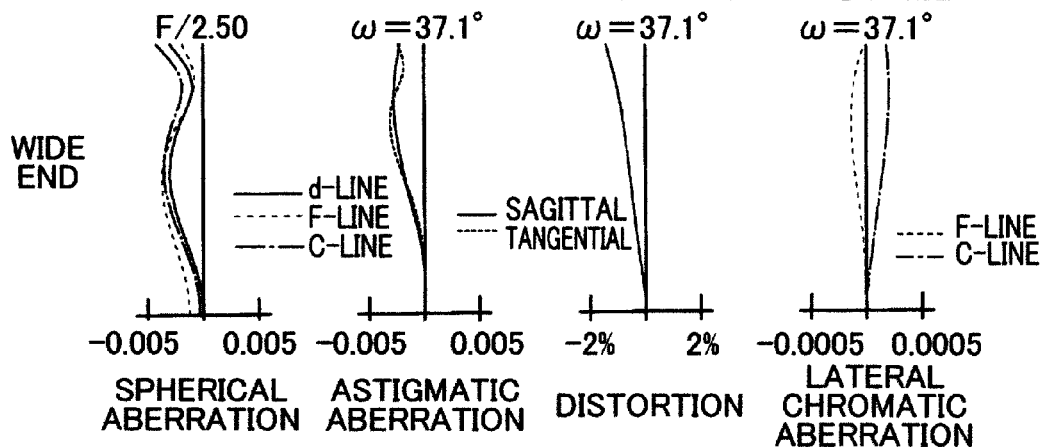
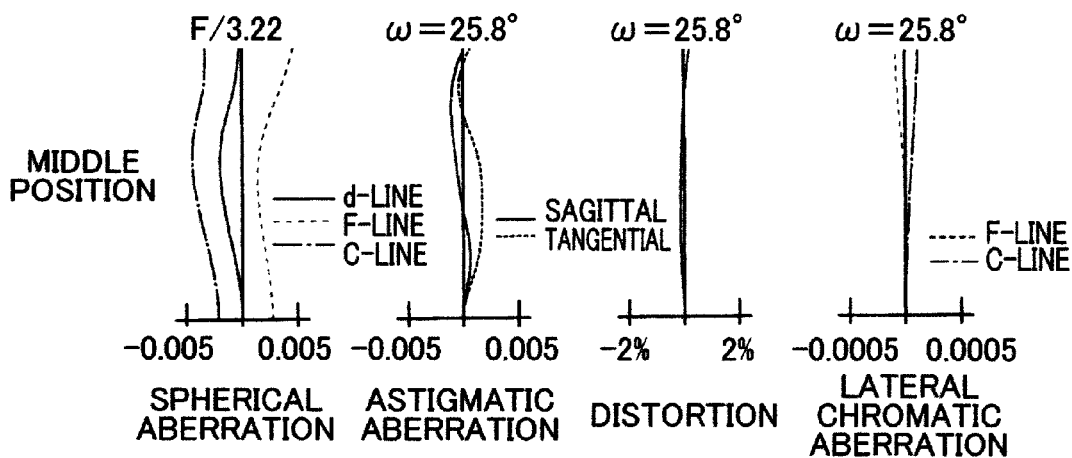
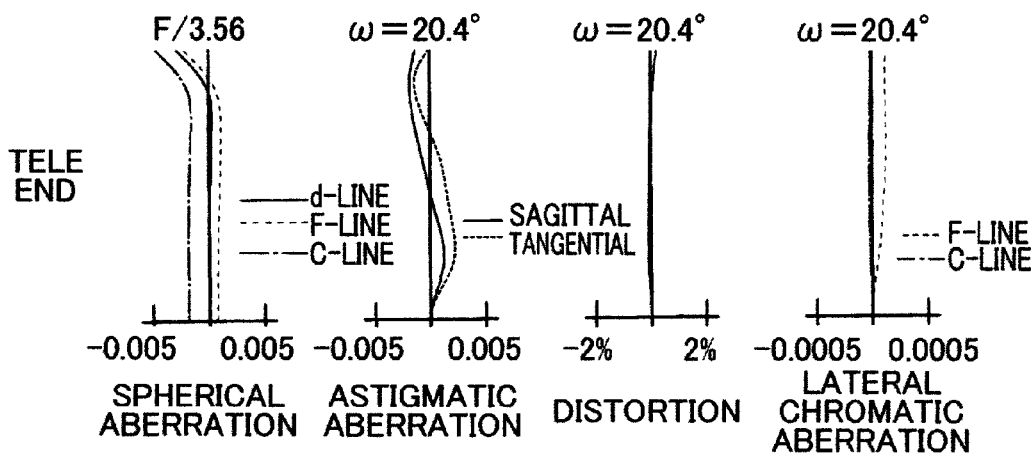

ZOOM LENS FOR PROJECTION AND PROJECTION-TYPE DISPLAY DEVICE

BACKGROUND OF THE INVENTION

1. Field of the Invention

The present invention relates to a zoom lens for projection and a projection-type display device on which the zoom lens for projection is mounted.

2. Description of the Related Art

In recent years, projection-type display devices, such as transmission-type or reflection-type liquid crystal display devices and DMD (digital micromirror device) display devices, which use various kinds of light bulbs and have relatively long back focus, were widely used. Further, the performance of such devices has been becoming higher.

The projection-type display device uses, as a projection lens, a zoom lens, which can change the size of an image formed on a screen, in many cases. Recently, there is an increasing demand for a zoom lens that can greatly change the size of the image, in other words, a zoom lens having a higher zoom ratio.

Further, a lens shift function and a widening function of the zoom lens became required. The lens shift function shifts the center of a projected image with respect to the projection-type display device, for example, to the upper side. The widening function can project a large image at a position close to the projection-type display device. Therefore, zoom lenses having wider angles (wider angles of view) are needed.

Further, an optical system or the like using a plurality of light bulbs needs space for inserting a prism that combines, together, light beams of various colors output from the plurality of light bulbs respectively. Therefore, long back focus is required.

Conventionally, this kind of projection-type zoom lens disclosed, for example, in Japanese Unexamined Patent Publication No. 2005-106948 (Patent Document 1) was known. In the zoom lens disclosed in Patent Document 1, the zoom ratio is greater than or equal to 1.5 times, which is relatively high. However, with respect to the angle of view, the zoom lens disclosed in Patent Document 1 does not satisfy the need for widening the angle of view in recent years.

Further, in recent years, the sizes of light bulbs became smaller, and the resolution of pixels became higher. Therefore, lateral chromatic aberration of a zoom lens for projection needs to be reduced further. However, in the zoom lens disclosed in Patent Document 1, the lateral chromatic aberration was not reduced sufficiently. Especially, the lateral chromatic aberration is an important factor that determines the image quality. If the lateral chromatic aberration is larger than or equal to half of the pixel of the light bulb, the quality of the projected image deteriorates extremely, and the quality of the image becomes intolerable for practical use in some cases.

As a method for reducing the lateral chromatic aberration, a method using a low-dispersion glass material is known.

When Abbe number vd of the low-dispersion glass material exceeds 65, the change (dn/dt) in the refractive index of the low-dispersion glass material with respect to a change in temperature is negative in most cases (the sign of the change is minus). When a low-dispersion glass material having higher Abbe number vd (for example, vd≧80) is used, the value of dn/dt is a negative value having a large absolute value.

Therefore, when the low-dispersion glass material is used for a lens having a positive refractive power, the focused position of the lens shifts toward the rear side (reduction side) as temperature increases, and the magnitude of the shift is greater, as the Abbe number of the material is higher. Further, a retrofocus-type lens, in which a lens group having a negative refractive power is located on the front side of the lens, is used in some cases, because it is relatively easy to increase the angle of view and to maintain long back focus. In the retrofocus-type lens, it is necessary to arrange many positive lenses on the reduction side of the pupil position thereof. Therefore, it is possible to correct the lateral chromatic aberration by using a low-dispersion glass material for the positive lenses.

However, when the positive lenses are made of low-dispersion glass material, as described above, especially if the Abbe number of the material is greater than or equal to 65, the change (dn/dt) in the refractive index with respect to the change in temperature of the material becomes large. Therefore, out-of-focus condition and deterioration in the optical performance, caused by the change in temperature, become noticeable, and even intolerable for actual use in some cases.

SUMMARY OF THE INVENTION

In view of the foregoing circumstances, it is an object of the present invention to provide a zoom lens for projection that has a wide angle of view and a high zoom ratio, in which a sufficiently long back focus for inserting a prism for combining light beams is maintained. The zoom lens for projection can prevent occurrence of out-of-focus condition and deterioration in the optical performance caused by a change in temperature, while the lateral chromatic aberration is reduced. Further, it is another object of the present invention to provide a projection-type display device on which the zoom lens for projection is mounted.

A first zoom lens for projection according to the present invention is a zoom lens for projection comprising:

a lens group having a negative refractive power that is arranged farthest to a magnification side of the zoom lens (in other words, closest to the magnification-side end of the zoom lens);

a lens group having a positive refractive power that is arranged farthest to a reduction side of the zoom lens (in other words, closest to the reduction-side end of the zoom lens); and at least one lens group that is arranged between the lens groups, and moves when the magnification of the zoom lens is changed, wherein the reduction side of the zoom lens forms a telecentric system, and wherein the lens group that is arranged farthest to the reduction side is fixed when the magnification of the zoom lens is changed, and is composed of a negative aspheric lens made of a plastic material having at least one aspheric surface and a positive lens, and wherein at least one positive lens arranged on the reduction side of a lens having the smallest effective diameter among lenses composing the zoom lens satisfies the following formula (1):

$$va > 80 \, (\text{here}, (dn/dt) < 0) \tag{1},$$

where va: Abbe number of the at least one positive lens arranged on the reduction side of the lens having the smallest effective diameter among lenses composing the zoom lens for d-line, and dn/dt: a change in the refractive index of the material forming the at least one positive lens arranged on the reduction side of the lens having the smallest effective diameter among lenses composing the zoom lens for d-line when temperature changes from 20° C.

A second zoom lens for projection according to the present invention is a zoom lens for projection, in which the at least one positive lens satisfying the formula (1) in the first zoom lens for projection further satisfies the following formula (2):

$$(dn/dt) < -4.0 \times 10^{-6} \quad (2).$$

A third zoom lens for projection according to the present invention is a zoom lens for projection, in which the following formula (3) is satisfied in the first or second zoom lens for projection:

$$\Sigma(1/fa) \times fw \leq 1.2 \quad (3),$$

where fa: the focal length of the at least one positive lens satisfying the formula (1), and fw: the focal length of the entire system of the zoom lens at a wide angle end.

A fourth zoom lens for projection according to the present invention is a zoom lens for projection, in which the following formula (4) is satisfied in anyone of the first to third zoom lenses for projection:

$$fas/fw \leq -5.0 \quad (4),$$

where fas: the focal length of the negative aspheric lens made of the plastic material.

A fifth zoom lens for projection according to the present invention is a zoom lens for projection, in which a lens group arranged second farthest to the reduction side (in other words, a lens group next to the lens group arranged farthest to the reduction side) of any one of the first to fourth zoom lenses for projection includes at least one lens satisfying the formula (1).

A sixth zoom lens for projection according to the present invention is a zoom lens for projection, in which a first lens group having a negative refractive power, a second lens group having a positive refractive power, a third lens group having a positive refractive power, a fourth lens group having a negative refractive power, a fifth lens group having a positive refractive power, and a sixth lens group having a positive refractive power are sequentially arranged from the magnification side of any one of the first to fifth zoom lenses for projection, and wherein the second lens group, the third lens group, the fourth lens group, and the fifth lens group of the six lens groups are movable when the magnification of the zoom lens is changed.

A seventh zoom lens for projection according to the present invention is a zoom lens for projection, in which a first lens group having a negative refractive power, a second lens group having a positive refractive power, a third lens group having a positive refractive power, a fourth lens group having a positive refractive power, and a fifth lens group having a positive refractive power are sequentially arranged from the magnification side of any one of the first to fifth zoom lenses for projection, and wherein the second lens group, the third lens group, and the fourth lens group of the five lens groups are movable when the magnification of the zoom lens is changed.

A projection-type display device according to the present invention is a projection-type display device comprising:

a light source;
a light bulb;
an illumination optical unit that guides a light beam output from the light source to the light bulb; and
any one of the first to seventh zoom lenses for projection, the reduction side of the zoom lens being telecentric, wherein the light beam output from the light source is modulated by the light bulb, and projected onto a screen by the zoom lens for projection.

The term "magnification side" means a projected side (screen side), and even in reduction projection, the screen side is referred to, for convenience, as the magnification side.

Meanwhile, the term "reduction side" means an original image display area side (light bulb side), and even in reduction projection, the light bulb side is referred to, for convenience, as the reduction side.

The zoom lens for projection of the present invention, and the projection-type display device using the zoom lens can achieve a wide angle of view and a high zoom ratio. Further, it is possible to maintain a sufficiently long back focus for inserting a prism for combining light beams, and to prevent occurrence of out-of-focus condition and deterioration in the optical performance caused by a change in temperature, while the lateral chromatic aberration is reduced.

In the zoom lens for projection of the present invention and the projection-type display device using the zoom lens, the lens group that is arranged farthest to the reduction side includes a negative aspheric lens made of a plastic material. Therefore, it is possible to prevent occurrence of out-of-focus condition and deterioration in the optical performance caused by a change in temperature.

Specifically, the change (dn/dt) in the refractive index of the plastic lens by a change in temperature is extremely large, compared with the change in the refractive index of a glass lens. Further, the change in the refractive index of the plastic lens is negative (the sign of the change is minus). Therefore, as described above, the main characteristic of the present invention is that the shift in the focused position toward the rear side (reduction side) by a change in temperature, the shift being induced by use of a low dispersion glass material for the positive lens, is compensated by a shift in the focused position toward the front side (magnification side), the shift being induced by use of the negative aspheric lens.

Further, since the aspheric lens is adopted, it is possible to reduce the deterioration in the performance by a change in temperature.

Further, since the negative aspheric lens is arranged in the fixed lens group that is farthest to the reduction side, the position of the aspheric lens does not change even when the magnification is changed by zooming. Therefore, even if the lens system has some kind of temperature distribution, the aspheric lens can reduce the change (dn/dt) in the entire zoom range.

Further, the lens group that is farthest to the reduction side is arranged at a position at which off-axial rays are high. Therefore, use of the aspheric lens in the lens group can efficiently reduce aberration, such as field curvature, to be corrected.

Further, since the reduction side is telecentric, it is necessary that the lens group farthest to the reduction side is structured to have a positive refractive power as a whole. Since this lens group is composed of the negative aspheric lens and one positive lens, it is possible to structure the lens system in a simple and compact manner.

BRIEF DESCRIPTION OF THE DRAWINGS

FIGS. 7A through 7L are diagrams illustrating aberrations of the zoom lens for projection of Example 1 at the wide angle end (wide), a middle position (middle), the telescopic end (tele);

FIGS. 8A through 8L are diagrams illustrating aberrations of the zoom lens for projection of Example 2 at the wide angle end (wide), a middle position (middle), the telescopic end (tele);

FIGS. 9A through 9L are diagrams illustrating aberrations of the zoom lens for projection of Example 3 at the wide angle end (wide), a middle position (middle), the telescopic end (tele);

FIGS. 10A through 10L are diagrams illustrating aberrations of the zoom lens for projection of Example 4 at the wide angle end (wide), a middle position (middle), the telescopic end (tele);

FIGS. 11A through 11L are diagrams illustrating aberrations of the zoom lens for projection of Example 5 at the wide angle end (wide), a middle position (middle), the telescopic end (tele);

FIGS. 12A through 12L are diagrams illustrating aberrations of the zoom lens for projection of Example 6 at the wide angle end (wide), a middle position (middle), the telescopic end (tele);

DESCRIPTION OF THE PREFERRED EMBODIMENTS

Figure 1:
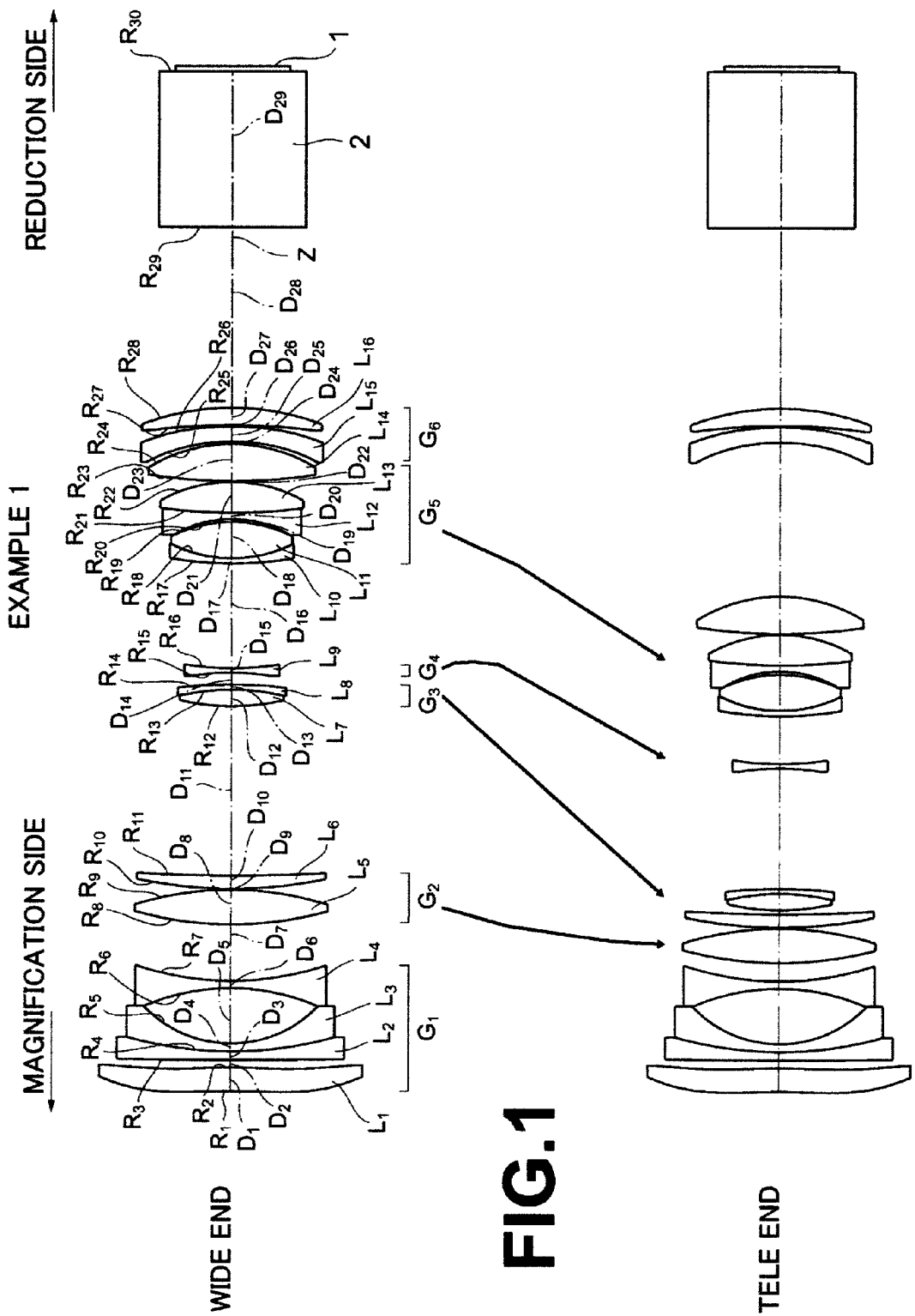
FIG. 1 is a diagram illustrating the structure of lenses in a zoom lens for projection of Example 1, and movement positions of respective lens groups at a wide angle end (wide) and a telescopic end (tele)

Hereinafter, embodiments of the present invention will be described with reference to drawings. FIG. 1 is a diagram illustrating the structure of lenses in a zoom lens of Example 1 of the present invention at a wide angle end (wide) and a telescopic end (tele). This zoom lens will be used as a representative example to describe the embodiments of the present invention.

A zoom lens according to the embodiment of the present invention may be used as a zoom lens for projection that is mounted on a projection-type display device. Basically, in the zoom lens according to the embodiment of the present invention, the lens group that is arranged farthest to the reduction side, and which is fixed when the magnification of the zoom lens is changed, is composed of a negative aspheric lens made of a plastic material having at least one aspheric surface and a positive lens. Further, at least one positive lens arranged on the reduction side of a lens having the smallest effective diameter among lenses composing the zoom lens satisfies the following formula (1):

$$\nu a > 80 ((dn/dt) < 0) \qquad (1),$$

where $\nu a$: Abbe number of the material forming the at least one positive lens arranged on the reduction side of the lens having the smallest effective diameter among lenses composing the zoom lens for d-line, and $dn/dt$: a change in the refractive index of the material forming the at least one positive lens arranged on the reduction side of the lens having the smallest effective diameter among lenses composing the zoom lens for d-line when temperature changes from 20° C.

For example, the zoom lens according the embodiment of the present invention may include first lens group $G_1$, second lens group $G_2$, third lens group $G_3$, fourth lens group $G_4$, fifth lens group $G_5$, and sixth lens group $G_6$ which are sequentially arranged from the magnification side. The first lens group $G_1$ has a negative refractive power, and performs focusing in a fixed state when the magnification is changed. The second lens group $G_2$ has a positive refractive power, and moves along optical axis Z when the magnification is changed. The third lens group $G_3$ has a positive refractive power, and moves along optical axis Z when the magnification is changed. The fourth lens group $G_4$ has a negative refractive power, and moves along optical axis Z when the magnification is changed. The fifth lens group $G_5$ has a positive refractive power, and moves along optical axis Z when the magnification is changed. (In Examples 5 and 6, the zoom lens includes second lens group $G_2$ having a positive refractive power, third lens group $G_3$ having a positive refractive power, and fourth lens group $G_4$ having a positive refractive power, which move along optical axis Z when the magnification is changed.) Further, the sixth lens group $G_6$ has a positive refractive power, and is fixed when the magnification is changed. (In Examples 5 and 6, the zoom lens includes fifth lens group $G_5$ having a positive refractive power, and which is fixed when the magnification is changed.)

It is desirable that the second lens group $G_2$, the third lens group $G_3$, the fourth lens group $G_4$, and the fifth lens group $G_5$ (in Examples 5 and 6, the second lens group $G_2$, the third lens group $G_3$, and the fourth lens group $G_4$) move respectively from the reduction side to the magnification side when the magnification is changed from the wide angle end to the telescopic end. The lens groups may move to the magnification side, after moving to the reduction side first (in Examples 1 through 4, the fourth lens group $G_4$ is set to move to the magnification, after moving to the reduction side).

Further, the reduction side is formed to be substantially telecentric (telecentric system).

Further, the fifth lens group $G_5$ (the fourth lens group $G_4$ in Examples 5 and 6) includes at least two positive lenses and at least two negative lenses.

In an example of the present invention, the first lens group $G_1$ is composed of four lenses $L_1$ through $L_4$ (in Examples 5 and 6, three lenses $L_1$ through $L_3$). The second lens group $G_2$ is composed of two lenses $L_5$ and $L_6$ (in Example 3, one lens $L_5$). The third lens group $G_3$ is composed of two lenses $L_7$ and $L_8$, and the fourth lens group $G_4$ is composed of one lens $L_9$ (in Examples 5 and 6, seven lenses $L_8$ through $L_{14}$). The fifth lens group $G_5$ is composed of five lenses $L_{10}$ through $L_{14}$ (in Examples 5 and 6, two lenses $L_{15}$ and $L_{16}$). The sixth lens group $G_6$ is composed of two lenses $L_{15}$ and $L_{16}$ (in Examples 5 and 6, no lens).

Further, focusing is performed, for example, by moving the whole first lens group $G_1$ in the direction of the optical axis Z.

The sixth lens group $G_6$ is a relay lens that is fixed when the magnification is changed. Further, a color combining prism 2 (including various kinds of filter, such as a low-pass filter, hereinafter) is arranged between the sixth lens group $G_6$ and an image display plane 1 as the light blub.

Further, when the first lens group $G_1$, which is farthest to the magnification side, includes a negative cemented lens obtained by cementing a negative lens having a concave surface facing the reduction side and a negative meniscus lens having a concave surface facing the reduction side together, it is possible to arrange the cemented lens at a position at which the off-axial rays are high. Therefore, the arrangement of the lenses can achieve an excellent effect of correcting the lateral chromatic aberration.

In this case, both of the two lenses composing the cemented lens are negative lenses. Therefore, it is possible to relatively easily maintain a wide angle of view and long back focus without damaging the negative refractive power of the first lens group $G_1$.

Further, if the first lens group $G_1$, which is farthest to the magnification side, is composed of four lenses, namely, an aspheric lens, a cemented lens obtained by cementing two lenses together, and a double-concave lens (a concave-concave lens), both surfaces of which are concave, it is possible to excellently reduce aberrations, such as the lateral chromatic aberration, in a compact structure.

Further, when an aspheric lens is provided on the magnification side or the reduction side of the cemented lens, it is possible to correct aberration by the aspheric lens at a position at which off-axial rays are high. Therefore, it is possible to efficiently reduce various kinds of aberration, such as distortion.

Further, it is desirable that the lens group that is second farthest to the reduction side includes four lenses that are a negative lens, a positive lens, a negative lens, and a positive lens sequentially arranged from the magnification side. When the fifth lens group that has a positive refractive power, as a whole, includes at least two positive lenses and at least two negative lenses, the achromatic effect by a combination of a negative lens and a positive lens can be amplified. Further, it is possible to effectively correct the field curvature (field curvature in a sagittal direction) induced by increasing the angle of view.

It is desirable that the four lenses, which are the negative lens, the positive lens, the negative lens, and the positive lens, form two sets of negative-positive cemented lenses. When the negative-positive cemented lens are arranged as described above, it is possible to further improve the achromatic effect and the effect of correcting the field curvature.

Figure 13:
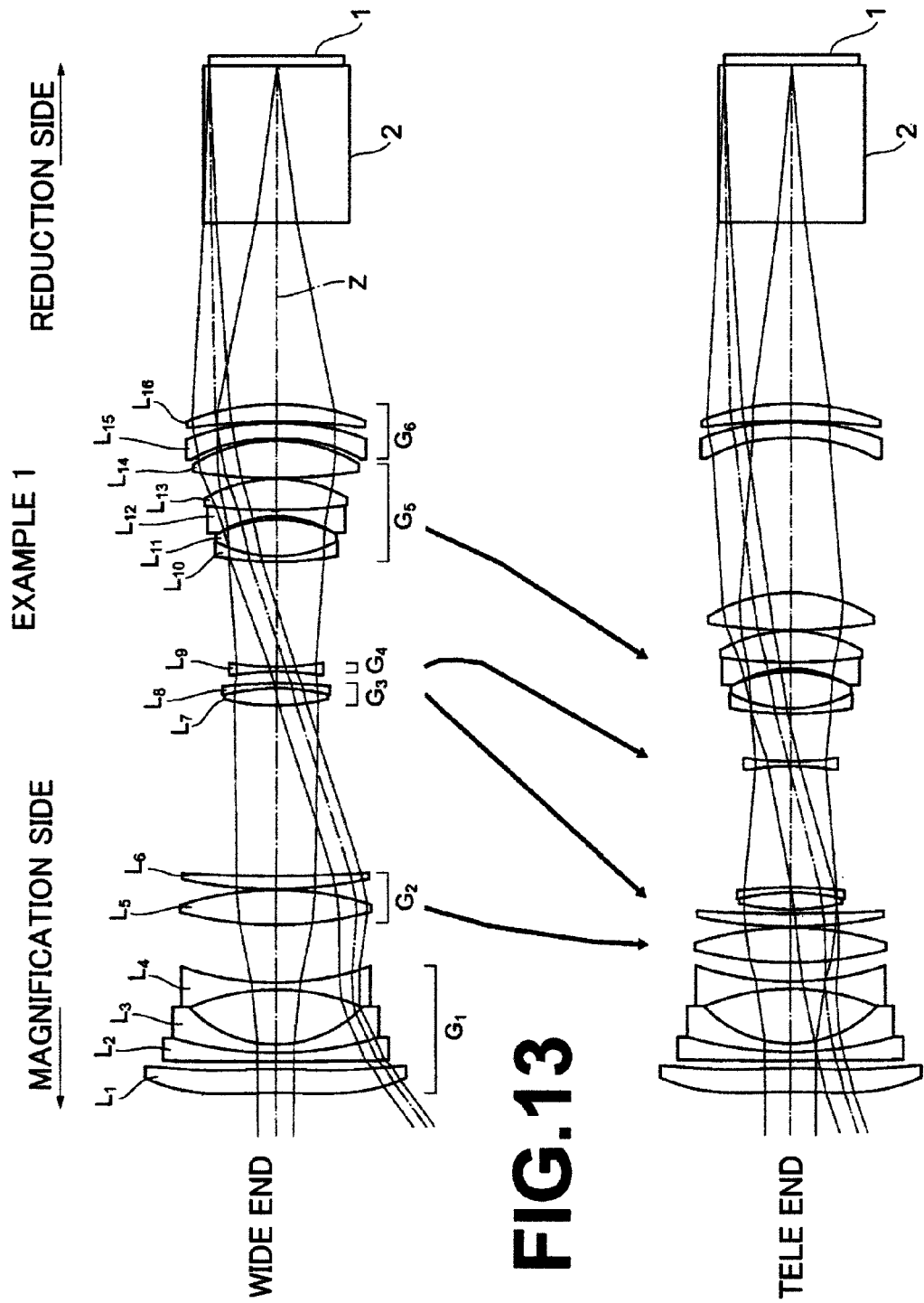
FIG. 13 is a diagram illustrating the structure of lenses in Example 1, in which the paths of rays are illustrated to indicate "a lens that has the smallest effective diameter among the lenses composing the zoom lens"

FIG. 13 is a diagram illustrating the structure of lenses in Example 1. In FIG. 13, the paths of rays are added to the diagram illustrated in FIG. 1 to indicate "a lens that has the smallest effective diameter among the lenses composing the zoom lens".

FIG. 13 illustrates that in Example 1, the ninth lens $L_9$ has the smallest effective diameter. In Examples 2 and 4, the ninth lens $L_9$ has the smallest effective diameter in a manner similar to Example 1. However, in Examples 3, 5 and 6, the eighth lens $L_8$ has the smallest effective diameter.

Further, it is desirable that the first lens group $G_1$ has at least one aspheric surface. Consequently, an aspheric surface is arranged in the first lens group $G_1$, in which the diameter of a light beam is large. Therefore, it is possible to efficiently reduce various kinds of aberration.

Further, the zoom lens for projection according to the present embodiment is structured to satisfy the following conditions, as described above.

Specifically, the lens group that is arranged farthest to the reduction side is composed of a negative aspheric lens made of a plastic material having at least one aspheric surface and a positive lens. Further, at least one positive lens arranged on the reduction side of a lens having the smallest effective diameter among lenses composing the zoom lens satisfies the following formula (1):

$$\nu a > 80 \text{(here, } (dn/dt) < 0) \tag{1}$$

where $\nu a$: Abbe number of the at least one positive lens arranged on the reduction side of the lens having the smallest effective diameter among lenses composing the zoom lens for d-line, and $dn/dt$: a change in the refractive index of the material forming the at least one positive lens arranged on the reduction side of the lens having the smallest effective diameter among lenses composing the zoom lens for d-line when temperature changes from 20° C.

A change ($dn/dt$) in the refractive index of a plastic lens with respect to a change in temperature is extremely large, compared with a change in the refractive index of a glass lens. Further, the change in the refractive index of the plastic lens is negative (the sign is minus). As describe above, when a low dispersion glass material is used for a positive lens to reduce the lateral chromatic aberration, the focused position shifts to the reduction side as temperature changes. However, since the negative aspheric lens acts to move the focused position, shifted by the change in temperature, back toward the magnification side, it is possible to remarkably reduce the out-of-focus state induced by the change in temperature.

Further, the aspheric lens can reduce the deterioration in performance caused by the change in temperature.

Further, since the negative aspheric lens is adopted as an element of the fixed lens group that is farthest to the reduction side, the position of the aspheric lens does not change even when the magnification is changed by zooming. Even if the lens system has some kind of distribution in temperature, the aspheric lens can achieve the effect of reducing the change ($dn/dt$) in the entire range of zooming.

The formula (1) effectively corrects the lateral chromatic aberration. When the Abbe number becomes lower than the lower limit defined in the formula (1), the lateral chromatic aberration is excessive, and it becomes difficult to correct the lateral chromatic aberration.

In the zoom lens for projection of the present embodiment, it is desirable that the at least one positive lens satisfying the formula (1) further satisfies the following formula (2):

$$(dn/dt) < -4.0 \times 10^{-6} \tag{2}$$

The formula (2) defines the magnitude of a change in the refractive index of the material forming the negative aspheric lens, which is arranged in a lens group farthest to the reduction side. When the change exceeds the upper limit defined in the formula (2), it becomes difficult to greatly reduce the out-of-focus condition caused by the change in temperature.

Therefore, it is more desirable that the following formula (2') is satisfied instead of the formula (2):

$$(dn/dt) < -5.0 \times 10^{-6} \tag{2'}$$

Further, it is desirable that the zoom lens for projection of the present embodiment satisfies the following formula (3):

$$\Sigma(1/fa) \times fw \leq 1.2 \tag{3}$$

where $fa$: the focal length of the at least one positive lens satisfying the formula (1), and $fw$: the focal length of the entire system of the zoom lens at a wide angle end.

The formula (3) represents the total of refractive powers of positive lenses satisfying the formula (1). When the total exceeds the upper limit defined by the formula (3), the refractive powers become out of balance. Further, the shift of the focused position tends to be insufficiently corrected.

Therefore, it is more desirable the following formula (3') is satisfied instead of the formula (3).

$$0.5 \leq \Sigma(1/fa) \times fw \leq 1.1 \quad (3')$$

Further, it is desirable that the zoom lens for projection according to the present embodiment satisfies the following formula (4):

$$fas/fw \leq -5.0 \quad (4),$$

where fas: the focal length of the negative aspheric lens made of the plastic material in the lens group farthest to the reduction side.

The formula (4) defines the power of the negative aspheric lens made of a plastic material. When the value of fas/fw exceeds the upper limit, the power of the aspheric lens becomes too strong. In such a case, it becomes necessary to increase the number of positive lenses satisfying the formula (1) to sufficiently correct the shift of the focused position. Further, since many positive lenses satisfying the formula (1) need to be used, the cost of the zoom lens increases.

Therefore, it is more desirable that the following formula (4') is satisfied instead of the formula (4):

$$fas/fw \leq -7.0 \quad (4').$$

Figure 14:
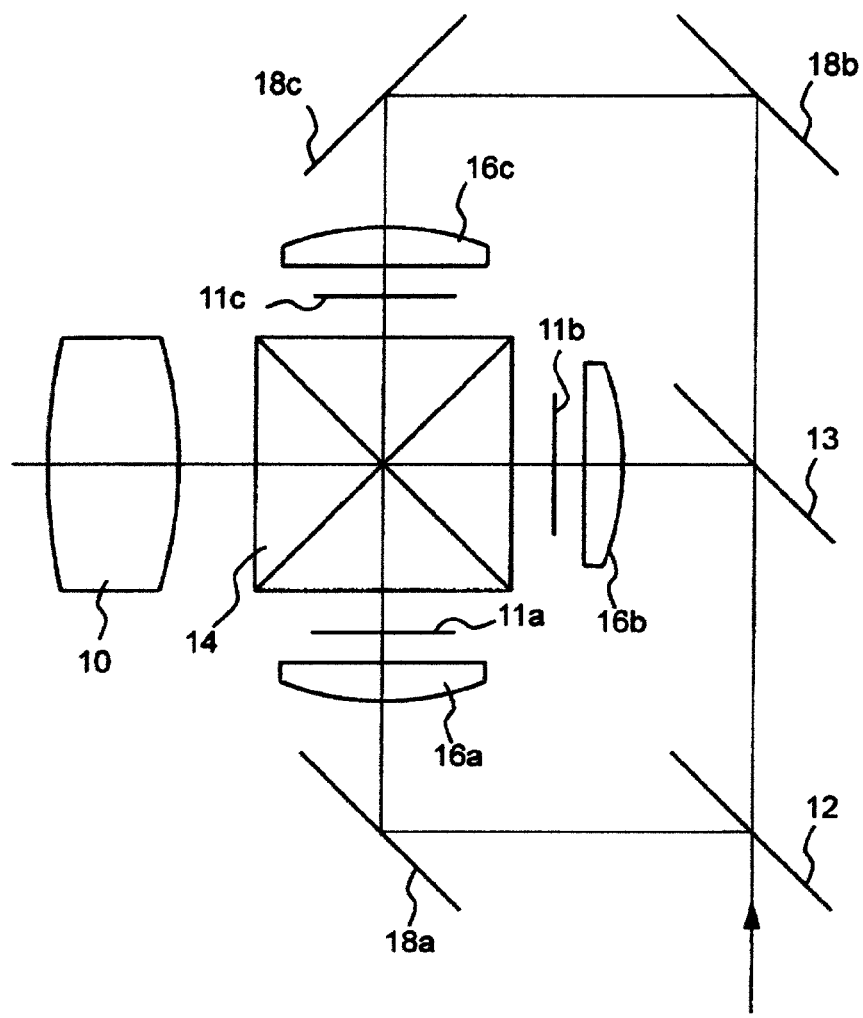
FIG. 14 is a schematic diagram illustrating a part of a projection-type display device according to an embodiment of the present invention.

Next, a projection-type display device according to an embodiment of the present invention will be described briefly. FIG. 14 is a schematic diagram illustrating the configuration of the projection-type display device according to the embodiment of the present invention.

The projection-type display device illustrated in FIG. 14 includes transmission-type liquid crystal panels 11a through 11c, as light bulbs. Further, the projection-type display device uses, as a lens 10 for projection, the zoom lens for projection according to the aforementioned embodiment of the present invention. Further, an integrator (not illustrated), such as a fly eye lens or lens array, is arranged between a light source 20 and a dichroic mirror 12. White light output from the light source 20 enters the liquid crystal panels 11a through 11c, which correspond to light beams of three colors (G light, B light and R light) respectively, through an illumination optical unit, and is modulated. Further, the modulated light is combined by a cross dichroic prism 14, and projected onto a screen (not illustrated) by the lens 10 for projection. The projection-type display device includes dichroic mirrors 12 and 13 for separating light, the dichroic prism 14 for combining colors, condenser lenses 16a through 16c, and total reflection mirrors 18a through 18c. The projection-type display device uses the zoom lens 10 for projection according to the embodiment of the present invention. Therefore, the projection-type display device is compact, and a wide angle of view is achieved. Further, the projection-type display device can project images that are light (bright) and that have good image quality.

The projection-type display device illustrated in FIG. 14 is an embodiment of the present invention, and various modifications are possible. For example, a reflection-type liquid crystal panel or a DMD may be used as the light bulb, instead of the transmission-type liquid crystal panel.

EXAMPLES

The zoom lens for projection according to the present invention will be further described by using specific examples. In the following descriptions, each numerical data set, such as R and D, is normalized so that the focal length at the wide angle end is 1.

Example 1

FIG. 1 is a diagram illustrating movement positions and movement paths of respective lens groups at a wide angle end (wide) and a telescopic end (tele) in a zoom lens for projection of Example 1.

In the zoom lens for projection of Example 1, first lens group $G_1$ is composed of first lens $L_1$, second lens $L_2$, third lens $L_3$, and fourth lens $L_4$, which are arranged sequentially from the magnification side of the zoom lens for projection. The first lens $L_1$ is a double-aspheric lens (aspheric-aspheric lens), both surfaces of which are aspheric, and has a weak power. The second lens $L_2$ is a negative meniscus lens having a concave surface facing the reduction side. The third lens $L_3$ is a negative meniscus lens having a concave surface facing the reduction side. The fourth lens $L_4$ is a double-concave lens, both surfaces of which are concave. Further, the second lens $L_2$ and the third lens $L_3$ are cemented together to form a cemented lens.

Second lens group $G_2$ is composed of fifth lens $L_5$, and sixth lens $L_6$, which are arranged sequentially from the magnification side. The fifth lens $L_5$ is a double-convex lens (convex-convex lens). The sixth lens $L_6$ is a positive meniscus lens having a convex surface facing the magnification side.

Third lens group $G_3$ is composed of seventh lens $L_7$, and eighth lens $L_8$, which are arranged sequentially from the magnification side. The seventh lens $L_7$ is a double-convex lens. The eighth lens $L_8$ is a negative meniscus lens having a convex surface facing the reduction side. The seventh lens $L_7$ and the eighth lens $L_8$ are cemented together to form a cemented lens.

Fourth lens group $G_4$ includes only ninth lens $L_9$, which is a double-concave lens. Fifth lens group $G_5$ is composed of tenth lens $L_{10}$, eleventh lens $L_{11}$, twelfth lens $L_{12}$, thirteenth lens $L_{13}$, and fourteenth lens $L_{14}$, which are arranged sequentially from the magnification side. The tenth lens $L_{10}$ is a negative meniscus lens having a convex surface facing the magnification side. The eleventh lens $L_{11}$ is a double-convex lens, and the twelfth lens $L_{12}$ is a double-concave lens. The thirteenth lens $L_{13}$ is a double-convex lens, and the fourteenth lens $L_{14}$ is a double-convex lens. The tenth lens $L_{10}$ and the eleventh lens $L_{11}$ are cemented together to form a cemented lens. Further, the twelfth lens $L_{12}$ and the thirteenth lens $L_{13}$ are cemented together to form a cemented lens.

Sixth lens group $G_6$ is composed of fifteenth lens $L_{15}$ and sixteenth lens $L_{16}$, which are arranged sequentially from the magnification side. The fifteenth lens $L_{15}$ is a double-aspheric lens that forms a negative meniscus lens having a convex surface facing the reduction side. The sixteenth lens $L_{16}$ is a positive meniscus lens having a convex surface facing the reduction side.

The aspheric surface of each of the first lens $L_1$ and the fifteenth lens $L_{15}$ is defined by the following equation:

$$Z = \frac{Y^2/R}{1 + \sqrt{1 - K \times Y^2/R^2}} + \sum_{i=3}^{12} A_i Y^i, \quad \text{[Equation 1]}$$

where
Z: the length of a perpendicular line from a point on an aspheric surface at distance Y from the optical axis to a tangent plane (plane perpendicular to the optical axis) on the vertex of the aspheric surface;
Y: a distance from the optical axis;

R: a curvature radius of the aspheric surface in the vicinity of the optical axis;

K: eccentricity; and $A_i$: aspheric coefficient (i=3 through 12).

As illustrated in FIG. 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 1 shows values of curvature radius R of each lens surface of the zoom lens for projection, center thickness of each lens and air gap (interval) between lenses (hereinafter, referred to as an "axial surface interval" (interval of surfaces on the optical axis) in general) D, and refractive index N and Abbe number ν of each lens for d-line. The numbers on the left side of Table 1 represent the order of each surface from the magnification side (same for Tables 3, 5, 7, 9, and 11).

The lower section of Table 1 shows intervals between lens groups at a wide angle end (wide), a middle position (middle), and a telescopic end (tele) (when the zoom lens is focused on infinity: same for Tables 3, 5, 7, 9, and 11). Further, Table 2 shows aspheric coefficients representing respective aspheric surfaces.

TABLE 1

FOCAL LENGTH F = 1.00~1.54~2.10

|     | R      | D     | Nd     | νd   |
| --- | ------ | ----- | ------ | ---- |
| 1*  | −6.749 | 0.258 | 1.4910 | 57.6 |
| 2*  | −6.806 | 0.082 |        |      |
| 3   | 65.413 | 0.094 | 1.8081 | 22.8 |
| 4   | 4.003  | 0.089 | 1.5891 | 61.1 |
| 5   | 1.301  | 0.601 |        |      |

TABLE 1-continued

FOCAL LENGTH F = 1.00~1.54~2.10

|     | R      | D           | Nd     | νd   |
| --- | ------ | ----------- | ------ | ---- |
| 6   | −2.381 | 0.078       | 1.4970 | 81.5 |
| 7   | 3.184  | (MOVEMENT 1)|        |      |
| 8   | 4.004  | 0.376       | 1.5955 | 39.2 |
| 9   | −3.447 | 0.010       |        |      |
| 10  | 4.973  | 0.141       | 1.8052 | 25.4 |
| 11  | 16.741 | (MOVEMENT 2)|        |      |
| 12  | 2.445  | 0.182       | 1.6034 | 38.0 |
| 13  | −2.445 | 0.054       | 1.8052 | 25.4 |
| 14  | −5.262 | (MOVEMENT 3)|        |      |
| 15  | −2.784 | 0.049       | 1.6968 | 55.5 |
| 16  | 3.236  | (MOVEMENT 4)|        |      |
| 17  | 3.974  | 0.056       | 1.8340 | 37.2 |
| 18  | 1.460  | 0.394       | 1.4970 | 81.5 |
| 19  | −1.460 | 0.035       |        |      |
| 20  | −1.204 | 0.066       | 1.8340 | 37.2 |
| 21  | 5.914  | 0.335       | 1.4970 | 81.5 |
| 22  | −1.560 | 0.009       |        |      |
| 23  | 6.004  | 0.404       | 1.4970 | 81.5 |
| 24  | −1.720 | (MOVEMENT 5)|        |      |
| 25* | −2.471 | 0.164       | 1.4910 | 57.6 |
| 26* | −3.587 | 0.014       |        |      |
| 27  | −7.109 | 0.191       | 1.8052 | 25.4 |
| 28  | −2.681 | 1.960       |        |      |
| 29  | ∞      | 1.690       | 1.5163 | 64.1 |
| 30  | ∞      |             |        |      |

| MOVEMENT INTERVAL | WIDE END | MIDDLE POSITION | TELE END |
| --- | --- | --- | --- |
| MOVEMENT 1 | 0.618 | 0.287 | 0.206 |
| MOVEMENT 2 | 1.838 | 1.164 | 0.044 |
| MOVEMENT 3 | 0.129 | 0.905 | 1.306 |
| MOVEMENT 4 | 1.135 | 0.587 | 0.518 |
| MOVEMENT 5 | 0.024 | 0.802 | 1.670 |

*IS ASPHERIC

TABLE 2

ASPHERIC COEFFICIENT

| SURFACE NUMBER | K | $A_3$ | $A_4$ | $A_5$ | $A_6$ |
| --- | --- | --- | --- | --- | --- |
| 1 | 19.40949 | −2.16048E−02 | 2.62828E−01 | −1.48178E−01 | −2.97724E−02 |

| | $A_7$ | $A_8$ | $A_9$ | $A_{10}$ | $A_{11}$ |
| --- | --- | --- | --- | --- | --- |
| | 6.43213E−02 | −4.81675E−03 | −1.77156E−02 | −1.00295E−03 | 9.88286E−03 |

| | $A_{12}$ |
| --- | --- |
| | −3.30187E−03 |

| | K | $A_3$ | $A_4$ | $A_5$ | $A_6$ |
| --- | --- | --- | --- | --- | --- |
| 2 | −8.99554 | −1.76603E−02 | 2.26236E−01 | −1.53432E−01 | −2.79709E−03 |

| | $A_7$ | $A_8$ | $A_9$ | $A_{10}$ | $A_{11}$ |
| --- | --- | --- | --- | --- | --- |
| | 1.35884E−02 | 6.64252E−03 | −7.41642E−04 | −1.32997E−03 | 2.23125E−03 |

| | $A_{12}$ |
| --- | --- |
| | −1.61665E−03 |

| | K | $A_3$ | $A_4$ | $A_5$ | $A_6$ |
| --- | --- | --- | --- | --- | --- |
| 25 | 1.00000 | 0.00000E+00 | −6.42221E−02 | −9.47620E−02 | 1.06517E−01 |

| | $A_7$ | $A_8$ | $A_9$ | $A_{10}$ |
| --- | --- | --- | --- | --- |
| | 5.79861E−02 | −4.48647E−02 | −5.00536E−02 | 3.45129E−02 |

TABLE 2-continued

| | ASPHERIC COEFFICIENT | | | | |
|---|---|---|---|---|---|
| | K | $A_3$ | $A_4$ | $A_5$ | $A_6$ |
| 26 | 1.00000 | 0.00000E+00 | −5.16120E−02 | −7.14236E−02 | 7.87214E−02 |
| | $A_7$ | $A_8$ | $A_9$ | $A_{10}$ | |
| | 5.49187E−02 | −2.30056E−02 | −6.17501E−02 | 3.54761E−02 | |

According to the zoom lens for projection of Example 1, all of the formulas (1) through (4), (2'), (3') and (4') are satisfied, as Table 13 shows.

FIGS. 7A through 7L are diagrams illustrating aberrations of the zoom lens for projection of Example 1 at the wide angle end (wide), a middle position (middle), the telescopic end (tele). FIGS. 7A through 7L illustrate spherical aberrations, astigmatic aberrations, distortions and lateral chromatic aberrations. In FIGS. 7B, 7F and 7J, which illustrate astigmatic aberrations, astigmatic aberrations with respect to sagittal image planes and astigmatic aberrations with respect to tangential image planes are illustrated (same for FIGS. 8B, 8F, and 8J through FIGS. 12B, 12F, and 12J).

As these diagrams illustrating aberrations clearly show, the zoom lens for projection of Example 1 can remarkably reduce a variation in various kinds of aberrations, such as spherical aberration and astigmatic aberration, caused by zooming. Further, it is possible to correct the aberrations in an extremely efficient manner.

Example 2

Figure 2:
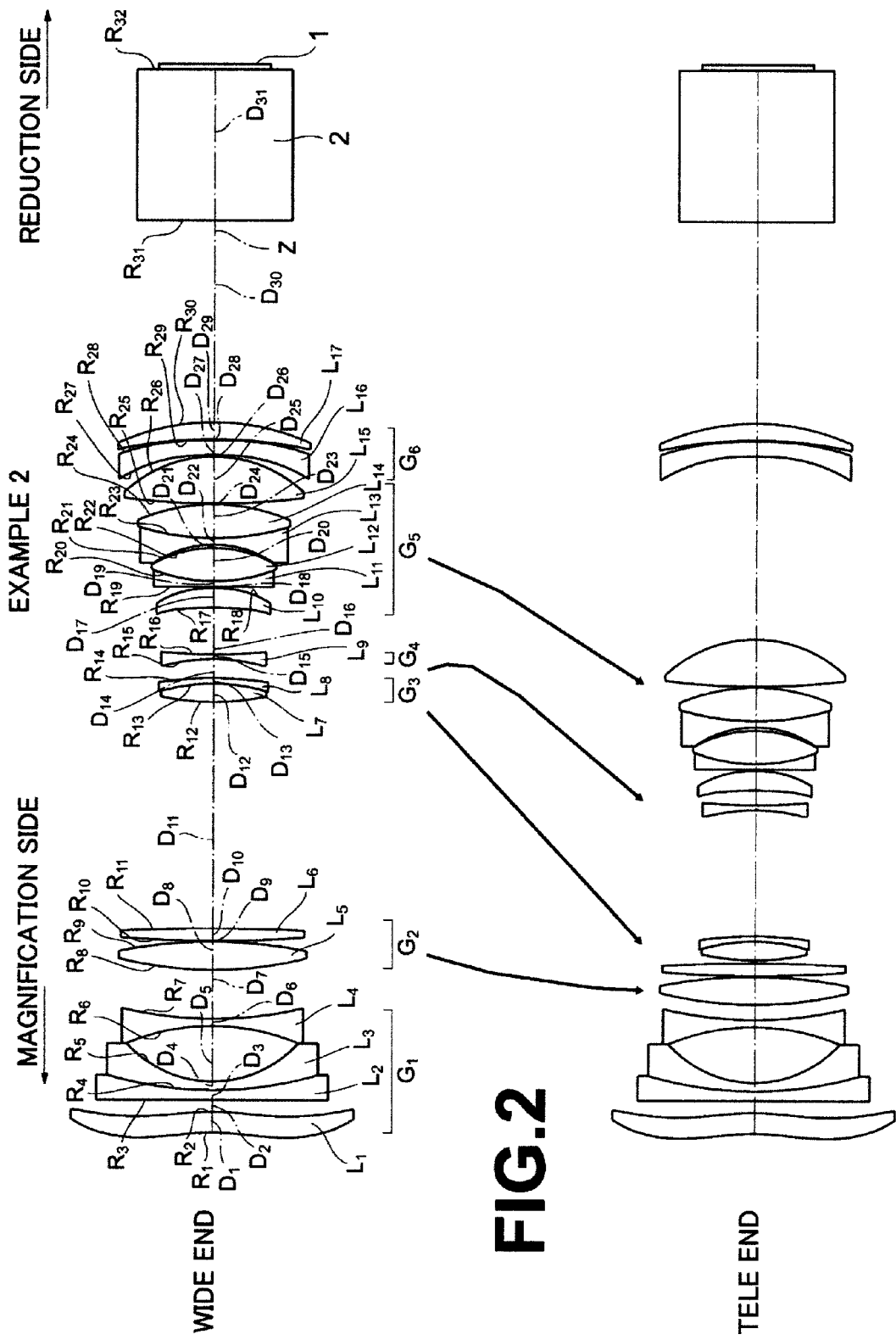
FIG. 2 is a diagram illustrating the structure of lenses in a zoom lens for projection of Example 2, and movement positions of respective lens groups at a wide angle end (wide) and a telescopic end (tele)

FIG. 2 is a diagram illustrating movement positions and movement paths of respective lens groups at a wide angle end (wide) and a telescopic end (tele) in a zoom lens for projection of Example 2.

The zoom lens for projection of Example 2 includes six lens groups in a manner basically similar to the zoom lens for projection of Example 1. However, the zoom lens for projection of Example 2 differs from the zoom lens for projection of Example 1 in that the second lens $L_2$ in the first lens group $G_1$ is a plano-concave lens having a concave surface facing the reduction side, and that the sixth lens $L_6$ in the second lens group $G_2$ is a double-convex lens. Further, in the zoom lens for projection of Example 2, the fifth lens group $G_5$ is composed of the tenth lens $L_{10}$, eleventh lens $L_{11}$, twelfth lens $L_{12}$, thirteenth lens $L_{13}$, fourteenth lens $L_{14}$, and fifteenth lens $L_{15}$, which are arranged sequentially from the magnification side, and the tenth lens $L_{10}$ is a double-aspheric lens in positive meniscus lens form having a convex surface facing the reduction side. Further, the eleventh lens $L_{11}$ is a negative meniscus lens having a convex surface facing the magnification side, and the twelfth lens $L_{12}$ is a double-convex lens. The thirteenth lens $L_{13}$ is a double-concave lens, and the fourteenth lens $L_{14}$ is a double-convex lens. The fifteenth lens $L_{15}$ is a double-convex lens. Further, the eleventh lens $L_{11}$ and the twelfth lens $L_{12}$ are cemented together to form a cemented lens. Further, the thirteenth lens $L_{13}$ and the fourteenth lens $L_{14}$ are cemented together to form a cemented lens.

As illustrated in FIG. 2, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 3 shows values of curvature radius R of each lens surface of the zoom lens for projection, axial surface interval D for each lens, and refractive index N and Abbe number ν of each lens for d-line.

The lower section of Table 3 shows intervals between lens groups at a wide angle end (wide), a middle position (middle), and a telescopic end (tele). Further, Table 4 shows aspheric coefficients representing respective aspheric surfaces.

TABLE 3

FOCAL LENGTH F = 1.00~1.60~2.30

| | R | D | Nd | νd |
|---|---|---|---|---|
| 1* | −2.414 | 0.239 | 1.4910 | 57.6 |
| 2* | −2.640 | 0.132 | | |
| 3 | ∞ | 0.114 | 1.8081 | 22.8 |
| 4 | 4.230 | 0.096 | 1.6180 | 63.3 |
| 5 | 1.294 | 0.637 | | |
| 6 | −2.468 | 0.081 | 1.4970 | 81.5 |
| 7 | 4.357 | (MOVEMENT 1) | | |
| 8 | 4.284 | 0.319 | 1.6990 | 30.1 |
| 9 | −5.456 | 0.010 | | |
| 10 | 13.163 | 0.142 | 1.7552 | 27.5 |
| 11 | −20.697 | (MOVEMENT 2) | | |
| 12 | 2.841 | 0.209 | 1.6129 | 37.0 |
| 13 | −2.147 | 0.060 | 1.8052 | 25.4 |
| 14 | −4.290 | (MOVEMENT 3) | | |
| 15 | −2.121 | 0.055 | 1.8040 | 46.6 |
| 16 | 7.367 | (MOVEMENT 4) | | |
| 17* | −5.251 | 0.224 | 1.5686 | 58.6 |
| 18* | −1.405 | 0.010 | | |
| 19 | 122.071 | 0.064 | 1.8040 | 46.6 |
| 20 | 1.883 | 0.378 | 1.4970 | 81.5 |
| 21 | −1.403 | 0.038 | | |
| 22 | −1.203 | 0.072 | 1.8061 | 40.9 |
| 23 | 2.924 | 0.383 | 1.4970 | 81.5 |
| 24 | −2.159 | 0.010 | | |
| 25 | 8.147 | 0.534 | 1.4970 | 81.5 |
| 26 | −1.477 | (MOVEMENT 5) | | |
| 27* | −3.220 | 0.168 | 1.4910 | 57.6 |
| 28* | −6.450 | 0.010 | | |
| 29 | −5.190 | 0.193 | 1.8052 | 25.4 |
| 30 | −2.631 | 2.276 | | |
| 31 | ∞ | 1.717 | 1.5163 | 64.1 |
| 32 | ∞ | | | |

| MOVEMENT INTERVAL | WIDE END | MIDDLE POSITION | TELE END |
|---|---|---|---|
| MOVEMENT 1 | 0.556 | 0.206 | 0.177 |
| MOVEMENT 2 | 2.564 | 1.477 | 0.037 |
| MOVEMENT 3 | 0.216 | 1.077 | 1.426 |
| MOVEMENT 4 | 0.525 | 0.187 | 0.168 |
| MOVEMENT 5 | 0.021 | 0.934 | 2.074 |

*IS ASPHERIC

TABLE 4

| ASPHERIC COEFFICIENT | | | | |
|---|---|---|---|---|
| SURFACE NUMBER | K | $A_3$ | $A_4$ | $A_5$ | $A_6$ |
| 1 | 1.82590 | −9.57258E−03 | 3.83470E−01 | −2.32984E−01 | −2.22317E−03 |
| | $A_7$ | $A_8$ | $A_9$ | $A_{10}$ | $A_{11}$ |
| | 4.50008E−02 | 4.14162E−03 | −8.72077E−03 | −2.53071E−03 | 2.68364E−03 |
| | $A_{12}$ | | | | |
| | −2.82519E−04 | | | | |
| | K | $A_3$ | $A_4$ | $A_5$ | $A_6$ |
| 2 | −1.24103 | −3.40605E−03 | 3.13404E−01 | −1.92720E−01 | −8.79290E−03 |
| | $A_7$ | $A_8$ | $A_9$ | $A_{10}$ | $A_{11}$ |
| | 1.76288E−02 | 8.90924E−03 | 5.27592E−04 | −2.32150E−03 | −8.85631E−04 |
| | $A_{12}$ | | | | |
| | 4.16303E−04 | | | | |
| | K | $A_4$ | $A_6$ | $A_8$ | $A_{10}$ |
| 17 | 1.00000 | −1.35166E−01 | −1.26873E−01 | −1.67517E−01 | 1.79226E−01 |
| | K | $A_4$ | $A_6$ | $A_8$ | $A_{10}$ |
| 18 | 1.00000 | −7.30848E−02 | −6.97596E−02 | −1.99401E−01 | 1.48971E−01 |
| | K | $A_3$ | $A_4$ | $A_5$ | $A_6$ |
| 27 | 1.00000 | 0.00000E+00 | −1.09369E−01 | 3.38263E−04 | 4.84136E−02 |
| | $A_7$ | $A_8$ | $A_9$ | $A_{10}$ | |
| | −1.04148E−02 | −5.35689E−03 | 1.09867E−02 | −7.14610E−03 | |
| | K | $A_3$ | $A_4$ | $A_5$ | $A_6$ |
| 28 | 1.00000 | 0.00000E+00 | −9.54722E−02 | 1.32362E−02 | 2.68614E−02 |
| | $A_7$ | $A_8$ | $A_9$ | $A_{10}$ | |
| | 9.50946E−03 | −4.36643E−03 | −7.39309E−03 | 2.55718E−03 | |

According to the zoom lens for projection of Example 2, all of the formulas (1) through (4), (2'), (3') and (4') are satisfied, as Table 13 shows.

FIGS. 8A through 8L are diagrams illustrating aberrations of the zoom lens for projection of Example 2 at the wide angle end (wide), a middle position (middle), the telescopic end (tele). FIGS. 8A through 8L illustrate spherical aberrations, astigmatic aberrations, distortions and lateral chromatic aberrations.

As these diagrams illustrating aberration clearly show, the zoom lens for projection of Example 2 can remarkably reduce a variation in various kinds of aberrations, such as spherical aberration and astigmatic aberration, caused by zooming. Further, it is possible to correct the aberrations in an extremely efficient manner.

Example 3

Figure 3:
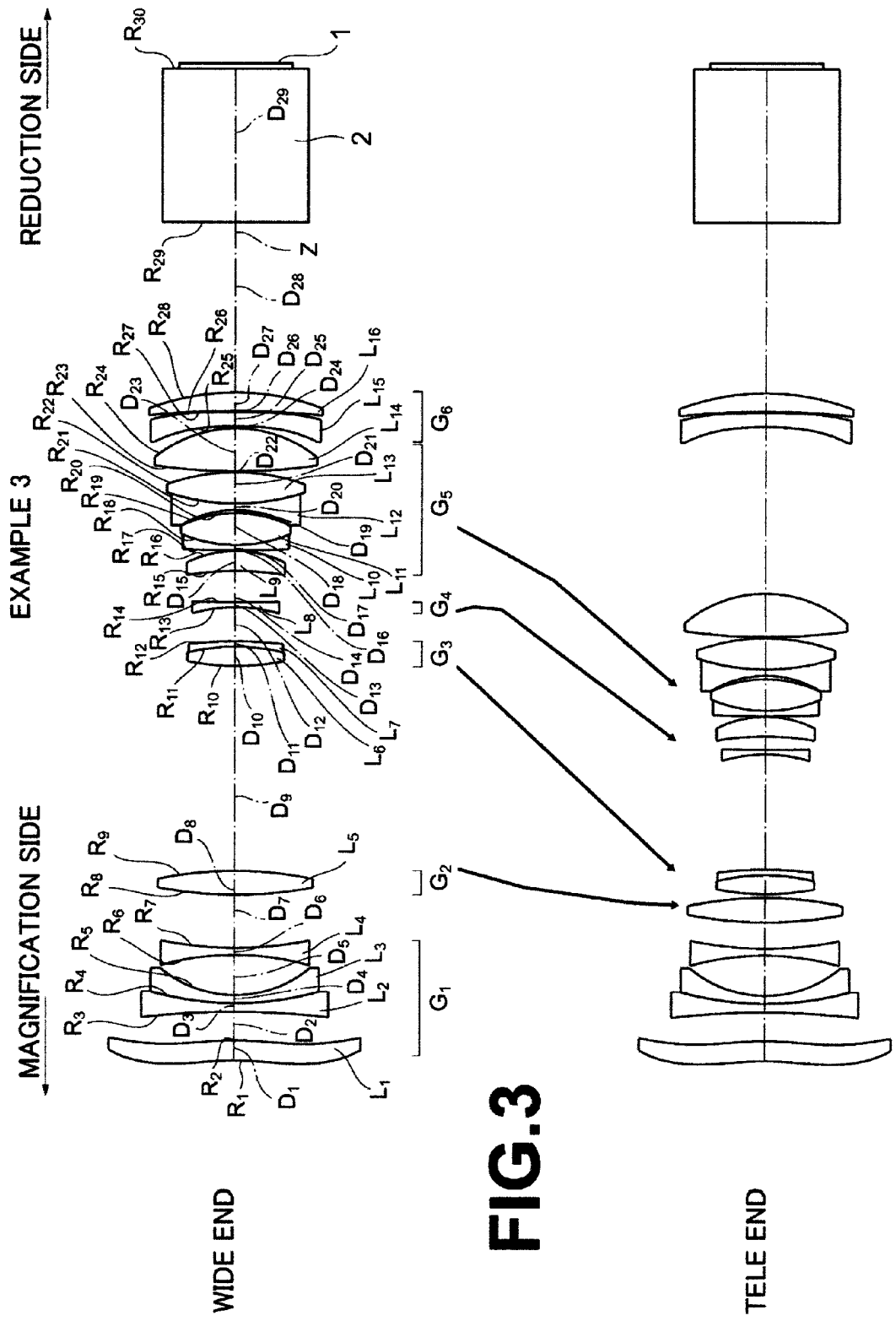
FIG. 3 is a diagram illustrating the structure of lenses in a zoom lens for projection of Example 3, and movement positions of respective lens groups at a wide angle end (wide) and a telescopic end (tele)

FIG. 3 is a diagram illustrating movement positions and movement paths of respective lens groups at a wide angle end (wide) and a telescopic end (tele) in a zoom lens for projection of Example 3.

The zoom lens for projection of Example 3 includes six lens groups in a manner basically similar to the zoom lens for projection of Example 1. However, the zoom lens for projection of Example 3 differs from the zoom lens for projection of Example 1 in that the second lens $L_2$ in the first lens group $G_1$ is a double-concave lens, and that the second lens group $G_2$ includes only the fifth lens $L_5$, which is a double-convex lens. Further, in the zoom lens for projection of Example 3, the fifth lens group $G_5$ is composed of the ninth lens $L_9$, tenth lens $L_{10}$, eleventh lens $L_{11}$, twelfth lens $L_{12}$, thirteenth lens $L_{13}$, and fourteenth lens $L_{14}$, which are arranged sequentially from the magnification side. The ninth lens $L_9$ is a double-aspheric lens in positive meniscus form having a convex surface facing the reduction side, and the tenth lens $L_{10}$ is a negative meniscus lens having a convex surface facing the magnification side. Further, the eleventh lens $L_{11}$ is a double-convex lens, and the twelfth lens $L_{12}$ is a double-concave lens. The thirteenth lens $L_{13}$ is a double-convex lens, and the fourteenth lens $L_{14}$ is a double-convex lens. Further, the tenth lens $L_{10}$ and the eleventh lens $L_{11}$ are cemented together to form a cemented lens. Further, the twelfth lens $L_{12}$ and the thirteenth lens $L_{13}$ are cemented together to form a cemented lens.

As illustrated in FIG. 3, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 5 shows values of curvature radius R of each lens surface of the zoom lens for projection, axial surface interval D for each lens, and refractive index N and Abbe number ν of each lens for d-line.

The lower section of Table 5 shows intervals between lens groups at a wide angle end (wide), a middle position (middle), and a telescopic end (tele). Further, Table 6 shows aspheric coefficients representing respective aspheric surfaces.

TABLE 5

FOCAL LENGTH F = 1.00~1.54~2.10

|  | R | D | Nd | νd |
|---|---|---|---|---|
| 1* | −2.906 | 0.224 | 1.4910 | 57.6 |
| 2* | −3.029 | 0.319 |  |  |
| 3 | −8.748 | 0.094 | 1.8081 | 22.8 |
| 4 | 3.432 | 0.088 | 1.5163 | 64.1 |
| 5 | 1.280 | 0.444 |  |  |
| 6 | −2.967 | 0.078 | 1.4970 | 81.5 |
| 7 | 4.062 | (MOVEMENT 1) |  |  |
| 8 | 4.475 | 0.265 | 1.8052 | 25.4 |
| 9 | −4.109 | (MOVEMENT 2) |  |  |
| 10 | 2.702 | 0.212 | 1.6477 | 33.8 |
| 11 | −2.166 | 0.058 | 1.8052 | 25.4 |
| 12 | −4.573 | (MOVEMENT 3) |  |  |
| 13 | −1.657 | 0.052 | 1.7725 | 49.6 |
| 14 | 19.873 | (MOVEMENT 4) |  |  |
| 15* | −4.013 | 0.217 | 1.5686 | 58.6 |
| 16* | −1.271 | 0.009 |  |  |
| 17 | 14.624 | 0.059 | 1.8061 | 33.3 |
| 18 | 1.529 | 0.350 | 1.4970 | 81.5 |
| 19 | −1.381 | 0.038 |  |  |
| 20 | −1.139 | 0.070 | 1.8061 | 40.9 |
| 21 | 2.434 | 0.344 | 1.4970 | 81.5 |
| 22 | −2.202 | 0.010 |  |  |
| 23 | 6.144 | 0.477 | 1.4970 | 81.5 |
| 24 | −1.396 | (MOVEMENT 5) |  |  |
| 25* | −4.553 | 0.156 | 1.4910 | 57.6 |
| 26* | −52.392 | 0.014 |  |  |
| 27 | −8.957 | 0.205 | 1.8052 | 25.4 |
| 28 | −2.688 | 1.874 |  |  |
| 29 | ∞ | 1.690 | 1.5163 | 64.1 |
| 30 | ∞ |  |  |  |

| MOVEMENT INTERVAL | WIDE END | MIDDLE POSITION | TELE END |
|---|---|---|---|
| MOVEMENT 1 | 0.581 | 0.302 | 0.293 |
| MOVEMENT 2 | 2.264 | 1.218 | 0.040 |
| MOVEMENT 3 | 0.375 | 1.019 | 1.269 |
| MOVEMENT 4 | 0.345 | 0.142 | 0.147 |
| MOVEMENT 5 | 0.023 | 0.907 | 1.838 |

*IS ASPHERIC

TABLE 6

ASPHERIC COEFFICIENT

| SURFACE NUMBER | K | $A_3$ | $A_4$ | $A_5$ | $A_6$ |
|---|---|---|---|---|---|
| 1 | 3.41481 | −1.95122E−02 | 3.89318E−01 | −2.21177E−01 | −3.72573E−02 |

|  | $A_7$ | $A_8$ | $A_9$ | $A_{10}$ | $A_{11}$ |
|---|---|---|---|---|---|
|  | 7.86534E−02 | 6.17284E−03 | −2.05624E−02 | −4.12282E−03 | 8.34529E−03 |

|  | $A_{12}$ |
|---|---|
|  | −1.68025E−03 |

|  | K | $A_3$ | $A_4$ | $A_5$ | $A_6$ |
|---|---|---|---|---|---|
| 2 | 1.21545 | −1.74420E−02 | 3.62126E−01 | −2.43184E−01 | 2.01088E−02 |

|  | $A_7$ | $A_8$ | $A_9$ | $A_{10}$ | $A_{11}$ |
|---|---|---|---|---|---|
|  | 2.09668E−02 | 3.59892E−03 | −2.28955E−03 | −1.24320E−03 | 1.48309E−03 |

|  | $A_{12}$ |
|---|---|
|  | −1.05939E−03 |

|  | K | $A_4$ | $A_6$ | $A_8$ | $A_{10}$ |
|---|---|---|---|---|---|
| 15 | 1.00000 | −8.69374E−02 | −8.76185E−02 | −2.00536E−01 | 4.65857E−01 |

|  | K | $A_4$ | $A_6$ | $A_8$ | $A_{10}$ |
|---|---|---|---|---|---|
| 16 | 1.00000 | −5.02330E−02 | −3.01175E−02 | −2.62216E−01 | 3.90774E−01 |

|  | K | $A_3$ | $A_4$ | $A_5$ | $A_6$ |
|---|---|---|---|---|---|
| 25 | 1.00000 | 0.00000E+00 | −2.00762E−01 | 1.77669E−02 | 7.83070E−02 |

TABLE 6-continued

| ASPHERIC COEFFICIENT | | | |
|---|---|---|---|
| $A_7$ | $A_8$ | $A_9$ | $A_{10}$ |
| 5.11123E−03 | −1.89020E−02 | 9.68672E−04 | −1.41954E−03 |

| | K | $A_3$ | $A_4$ | $A_5$ | $A_6$ |
|---|---|---|---|---|---|
| 26 | 1.00000 | 0.00000E+00 | −1.81453E−01 | 3.27399E−02 | 6.63067E−02 |

| $A_7$ | $A_8$ | $A_9$ | $A_{10}$ |
|---|---|---|---|
| 1.68995E−02 | −1.64092E−02 | −2.47189E−02 | 1.39104E−02 |

According to the zoom lens for projection of Example 3, all of the formulas (1) through (4), (2'), (3') and (4') are satisfied, as Table 13 shows.

FIGS. 9A, through 9L are diagrams illustrating aberrations of the zoom lens for projection of Example 3 at the wide angle end (wide), a middle position (middle), the telescopic end (tele). FIGS. 9A through 9L illustrate spherical aberrations, astigmatic aberrations, distortions and lateral chromatic aberrations.

As these diagrams illustrating aberration clearly show, the zoom lens for projection of Example 3 can remarkably reduce a variation in various kinds of aberrations, such as spherical aberration and astigmatic aberration, caused by zooming. Further, it is possible to correct the aberrations in an extremely efficient manner.

Example 4

Figure 4:
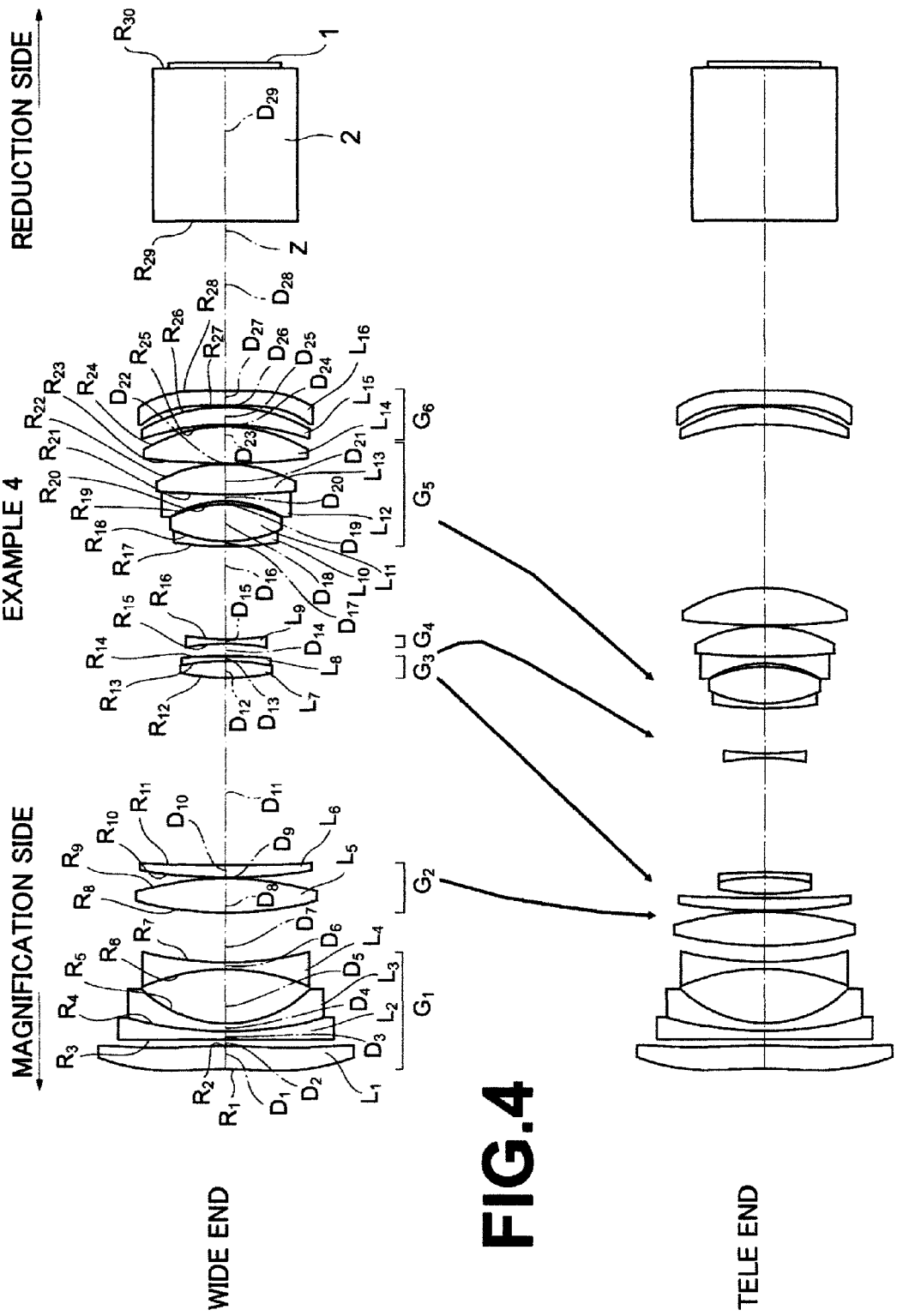
FIG. 4 is a diagram illustrating the structure of lenses in a zoom lens for projection of Example 4, and movement positions of respective lens groups at a wide angle end (wide) and a telescopic end (tele)

FIG. 4 is a diagram illustrating movement positions and movement paths of respective lens groups at a wide angle end (wide) and a telescopic end (tele) in a zoom lens for projection of Example 4.

The zoom lens for projection of Example 4 includes six lens groups in a manner basically similar to the zoom lens for projection of Example 1. However, the zoom lens for projection of Example 4 differs from the zoom lens for projection of Example 1 in that the second lens $L_2$ in the first lens group $G_1$ is a plano-concave lens having a concave surface facing the reduction side. Further, in the zoom lens for projection of Example 4, the fifteenth lens $L_{15}$ in the sixth lens group $G_6$ is a positive meniscus lens having a convex surface facing the reduction side, while the sixteenth lens $L_{16}$ in the six lens group $G_6$ is a double aspheric lens.

As illustrated in FIG. 4, in a manner substantially similar to Example 1, when the magnification is changed, the first lens group $G_1$ and the sixth lens group $G_6$ are fixed groups, and the second lens group $G_2$ through the fifth lens group $G_5$ are movable groups.

Further, the reduction side is substantially telecentric.

Table 7 shows values of curvature radius R of each lens surface of the zoom lens for projection, axial surface interval D for each lens, and refractive index N and Abbe number ν of each lens for d-line.

The lower section of Table 7 shows intervals between lens groups at a wide angle end (wide), a middle position (middle), and a telescopic end (tele). Further, Table 8 shows aspheric coefficients representing respective aspheric surfaces.

TABLE 7

FOCAL LENGTH F = 1.00~1.54~2.10

| | R | D | Nd | νd |
|---|---|---|---|---|
| 1* | −6.386 | 0.258 | 1.4910 | 57.6 |
| 2* | −6.180 | 0.072 | | |
| 3 | ∞ | 0.094 | 1.8081 | 22.8 |
| 4 | 3.963 | 0.087 | 1.5891 | 61.1 |
| 5 | 1.312 | 0.600 | | |
| 6 | −2.345 | 0.078 | 1.4970 | 81.5 |
| 7 | 3.540 | (MOVEMENT 1) | | |
| 8 | 3.914 | 0.376 | 1.5955 | 39.2 |
| 9 | −3.492 | 0.010 | | |
| 10 | 5.577 | 0.136 | 1.8052 | 25.4 |
| 11 | 18.581 | (MOVEMENT 2) | | |
| 12 | 2.469 | 0.187 | 1.6200 | 36.3 |
| 13 | −2.469 | 0.054 | 1.8052 | 25.4 |
| 14 | −5.604 | (MOVEMENT 3) | | |
| 15 | −2.420 | 0.049 | 1.6204 | 60.3 |
| 16 | 3.293 | (MOVEMENT 4) | | |
| 17 | 3.688 | 0.056 | 1.8340 | 37.2 |
| 18 | 1.445 | 0.408 | 1.4970 | 81.5 |
| 19 | −1.445 | 0.036 | | |
| 20 | −1.194 | 0.073 | 1.8340 | 37.2 |
| 21 | 7.187 | 0.336 | 1.4970 | 81.5 |
| 22 | −1.626 | 0.009 | | |
| 23 | 7.038 | 0.411 | 1.4970 | 81.5 |
| 24 | −1.724 | (MOVEMENT 5) | | |
| 25 | −2.815 | 0.198 | 1.8052 | 25.4 |
| 26 | −1.837 | 0.014 | | |
| 27* | −23.727 | 0.165 | 1.4910 | 57.6 |
| 28* | 101.544 | 1.872 | | |
| 29 | ∞ | 1.690 | 1.5163 | 64.1 |
| 30 | ∞ | | | |

| MOVEMENT INTERVAL | WIDE END | MIDDLE POSITION | TELE END |
|---|---|---|---|
| MOVEMENT 1 | 0.554 | 0.243 | 0.186 |
| MOVEMENT 2 | 2.078 | 1.310 | 0.046 |
| MOVEMENT 3 | 0.139 | 0.935 | 1.263 |
| MOVEMENT 4 | 1.020 | 0.502 | 0.503 |
| MOVEMENT 5 | 0.020 | 0.821 | 1.813 |

*IS ASPHERIC

TABLE 8

ASPHERIC COEFFICIENT

| SURFACE NUMBER | K | $A_3$ | $A_4$ | $A_5$ | $A_6$ |
|---|---|---|---|---|---|
| 1 | 16.94258 | −8.06640E−03 | 2.20829E−01 | −1.10864E−01 | −3.92618E−02 |
| | $A_7$ | $A_8$ | $A_9$ | $A_{10}$ | $A_{11}$ |
| | 6.06818E−02 | −3.54785E−03 | −1.69356E−02 | −1.31120E−03 | 9.48391E−03 |
| | $A_{12}$ | | | | |
| | −3.10990E−03 | | | | |
| | K | $A_3$ | $A_4$ | $A_5$ | $A_6$ |
| 2 | −8.18860 | −6.29397E−03 | 1.89092E−01 | −1.33392E−01 | 5.92269E−03 |
| | $A_7$ | $A_8$ | $A_9$ | $A_{10}$ | $A_{11}$ |
| | 9.55112E−03 | 2.56187E−03 | −1.55805E−03 | −4.26487E−04 | 3.03065E−03 |
| | $A_{12}$ | | | | |
| | −1.84422E−03 | | | | |
| | K | $A_3$ | $A_4$ | $A_5$ | $A_6$ |
| 27 | 1.00000 | 0.00000E+00 | −2.41684E−01 | −9.06829E−02 | 4.80509E−02 |
| | $A_7$ | $A_8$ | $A_9$ | $A_{10}$ | |
| | 5.73358E−02 | −1.17728E−02 | −5.70040E−02 | 4.23772E−02 | |
| | K | $A_3$ | $A_4$ | $A_5$ | $A_6$ |
| 28 | 1.00000 | 0.00000E+00 | −2.25678E−01 | −1.02322E−01 | 1.01576E−01 |
| | $A_7$ | $A_8$ | $A_9$ | $A_{10}$ | |
| | 4.66553E−02 | −2.70768E−02 | −3.39232E−02 | 2.53492E−02 | |

According to the zoom lens for projection of Example 4, all of the formulas (1) through (4), (2'), (3') and (4') are satisfied, as Table 13 shows.

FIGS. 10A through 10L are diagrams illustrating aberrations of the zoom lens for projection of Example 4 at the wide angle end (wide), a middle position (middle), the telescopic end (tele). FIGS. 10A through 10L illustrate spherical aberrations, astigmatic aberrations, distortions and lateral chromatic aberrations.

As these diagrams illustrating aberration clearly show, the zoom lens for projection of Example 4 can remarkably reduce a variation in various kinds of aberrations, such as spherical aberration and astigmatic aberration, caused by zooming. Further, it is possible to correct the aberrations in an extremely efficient manner.

Example 5

Figure 5:
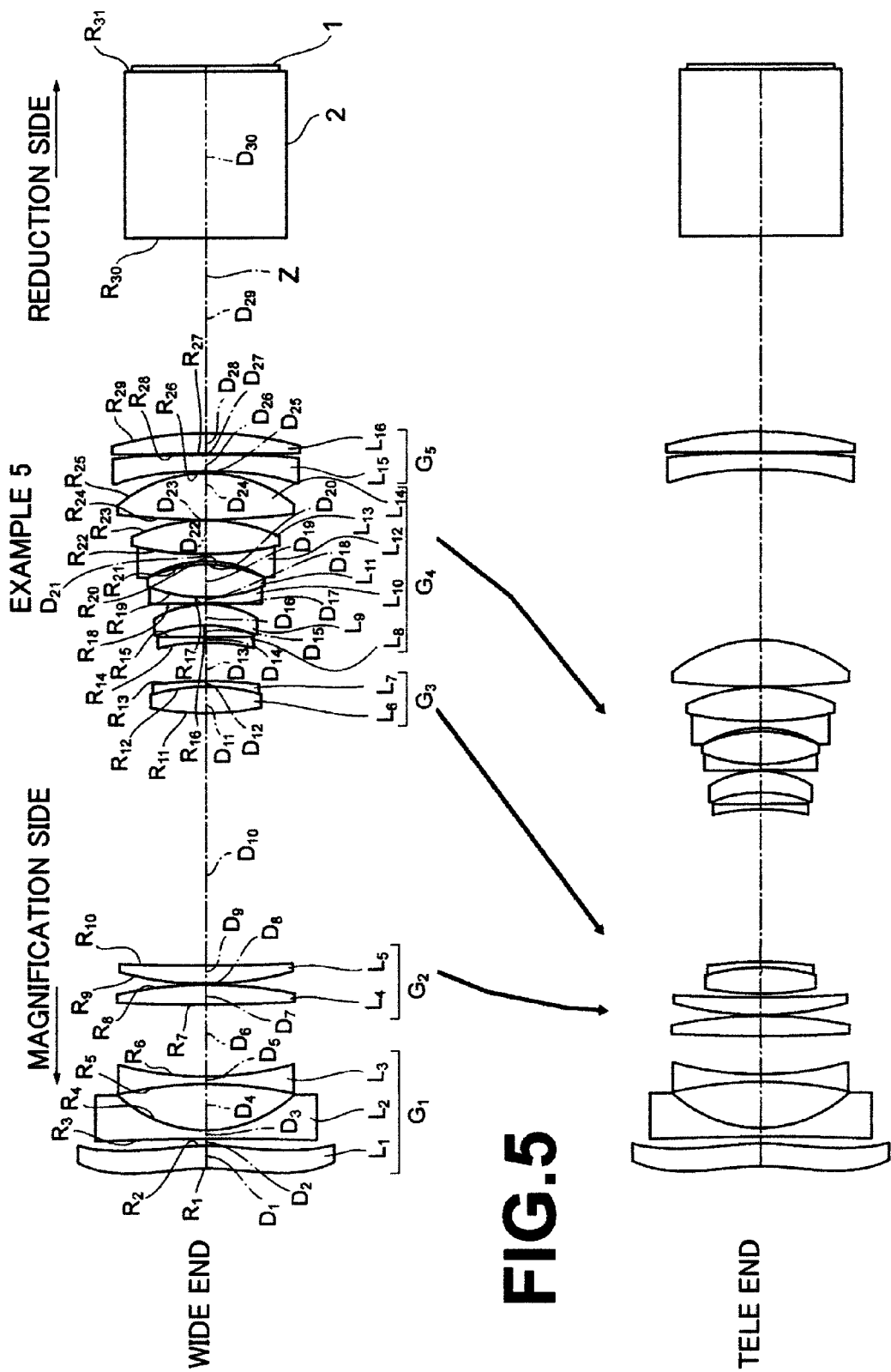
FIG. 5 is a diagram illustrating the structure of lenses in a zoom lens for projection of Example 5, and movement positions of respective lens groups at a wide angle end (wide) and a telescopic end (tele)

FIG. 5 is a diagram illustrating movement positions and movement paths of respective lens groups at a wide angle end (wide) and a telescopic end (tele) in a zoom lens for projection of Example 5.

Unlike the above examples, the zoom lens for projection of Example 5 has five-lens-group structure, which includes five lens groups.

In the zoom lens for projection of Example 5, the first lens group $G_1$ is composed of first lens $L_1$, second lens $L_2$, and third lens $L_3$, which are arranged sequentially from the magnification side of the zoom lens for projection. The first lens $L_1$ is a double-aspheric lens having a weak power. The second lens $L_2$ is a double-concave lens, and the third lens $L_3$ is a double-concave lens.

The second lens group $G_2$ is composed of fourth lens $L_4$, and fifth lens $L_5$, which are arranged sequentially from the magnification side. The fourth lens $L_4$ is a double-convex lens, and the fifth lens $L_5$ is a positive meniscus lens having a convex surface facing the magnification side.

The third lens group $G_3$ includes sixth lens $L_6$, and seventh lens $L_7$, which are arranged sequentially from the magnification side. The sixth lens $L_6$ is a double-convex lens, and the seventh lens $L_7$ is a negative meniscus lens having a convex surface facing the reduction side. The sixth lens $L_6$ and the seventh lens $L_7$ are cemented together to form a cemented lens.

The fourth lens group $G_4$ is composed of eighth lens $L_8$, ninth lens $L_9$, tenth lens $L_{10}$, eleventh lens $L_{11}$, twelfth lens $L_{12}$, thirteenth lens $L_{13}$, and fourteenth lens $L_{14}$, which are arranged sequentially from the magnification side. The eighth lens $L_8$ is a double-concave lens, and the ninth lens $L_9$ is a double-aspheric lens in positive meniscus form having a convex surface facing the reduction side. The tenth lens $L_{10}$ is a double-concave lens, and the eleventh lens $L_{11}$ is a double-convex lens. The twelfth lens $L_{12}$ is a double-concave lens, and the thirteenth lens $L_{13}$ is a double-convex lens. The fourteenth lens $L_{14}$ is a double-convex lens. The tenth lens $L_{10}$ and the eleventh lens $L_{11}$ are cemented together to form a cemented lens. Further, the twelfth lens $L_{12}$ and the thirteenth lens $L_{13}$ are cemented together to form a cemented lens.

Fifth lens group $G_5$ is composed of fifteenth lens $L_{15}$ and sixteenth lens $L_{16}$. The fifteenth lens $L_{15}$ is a double-aspheric lens (double-concave on the optical axis), and the sixteenth lens $L_{16}$ is a double-convex lens.

As illustrated in FIG. 5, when the magnification is changed, the first lens group $G_1$ and the fifth lens group $G_5$ are fixed groups, and the second lens group $G_2$ through the fourth lens group $G_4$ are movable groups.

Further, the reduction side is substantially telecentric.

Table 9 shows values of curvature radius R of each lens surface of the zoom lens for projection, axial surface interval D for each lens, and refractive index N and Abbe number ν of each lens for d-line.

The lower section of Table 9 shows intervals between lens groups at a wide angle end (wide), a middle position (middle), and a telescopic end (tele). Further, Table 10 shows aspheric coefficients representing respective aspheric surfaces.

TABLE 9

FOCAL LENGTH F = 1.00~1.54~2.00

|  | R | D | Nd | νd |
|---|---|---|---|---|
| 1* | −2.438 | 0.228 | 1.4910 | 57.6 |
| 2* | −2.621 | 0.073 |  |  |
| 3 | −32.372 | 0.088 | 1.5891 | 61.1 |
| 4 | 1.304 | 0.470 |  |  |
| 5 | −3.963 | 0.078 | 1.6180 | 63.3 |
| 6 | 3.286 | (MOVEMENT 1) |  |  |
| 7 | 17.884 | 0.203 | 1.5814 | 40.7 |
| 8 | −4.366 | 0.009 |  |  |
| 9 | 3.240 | 0.182 | 1.7283 | 28.5 |

TABLE 9-continued

FOCAL LENGTH F = 1.00~1.54~2.00

| 10 | 17.727 | (MOVEMENT 2) |  |  |
|---|---|---|---|---|
| 11 | 2.992 | 0.265 | 1.6103 | 38.3 |
| 12 | −2.017 | 0.058 | 1.8052 | 25.4 |
| 13 | −3.947 | (MOVEMENT 3) |  |  |
| 14 | −2.111 | 0.052 | 1.8040 | 46.6 |
| 15 | 112.724 | 0.116 |  |  |
| 16* | −1.632 | 0.217 | 1.5686 | 58.6 |
| 17* | −1.064 | 0.009 |  |  |
| 18 | −33.274 | 0.059 | 1.8040 | 46.6 |
| 19 | 1.588 | 0.333 | 1.4970 | 81.5 |
| 20 | −1.381 | 0.035 |  |  |
| 21 | −1.140 | 0.070 | 1.8340 | 37.2 |
| 22 | 3.319 | 0.341 | 1.4970 | 81.5 |
| 23 | −1.799 | 0.009 |  |  |
| 24 | 7.470 | 0.468 | 1.4970 | 81.5 |
| 25 | −1.410 | (MOVEMENT 4) |  |  |
| 26* | −5.293 | 0.164 | 1.4910 | 57.6 |
| 27* | 67.625 | 0.009 |  |  |
| 28 | 166.690 | 0.213 | 1.8052 | 25.4 |
| 29 | −3.508 | 1.978 |  |  |
| 30 | ∞ | 1.692 | 1.5163 | 64.1 |
| 31 | ∞ |  |  |  |

| MOVEMENT INTERVAL | WIDE END | MIDDLE POSITION | TELE END |
|---|---|---|---|
| MOVEMENT 1 | 0.726 | 0.392 | 0.389 |
| MOVEMENT 2 | 2.553 | 1.107 | 0.035 |
| MOVEMENT 3 | 0.384 | 1.224 | 1.536 |
| MOVEMENT 4 | 0.021 | 0.960 | 1.723 |

*IS ASPHERIC

TABLE 10

ASPHERIC COEFFICIENT

| SURFACE NUMBER | K | $A_3$ | $A_4$ | $A_5$ | $A_6$ |
|---|---|---|---|---|---|
| 1 | 1.24200 | −1.79508E−02 | 4.07493E−01 | −2.16432E−01 | −4.87376E−02 |
|  |  | $A_7$ | $A_8$ | $A_9$ | $A_{10}$ | $A_{11}$ |
|  |  | 6.29978E−02 | 1.09080E−02 | −1.28056E−02 | −5.00715E−03 | 3.58170E−03 |
|  |  | $A_{12}$ |  |  |  |  |
|  |  | 5.76956E−04 |  |  |  |  |
|  | K | $A_3$ | $A_4$ | $A_5$ | $A_6$ |
| 2 | 1.29260 | −1.45259E−02 | 3.66187E−01 | −2.05799E−01 | −3.28608E−03 |
|  |  | $A_7$ | $A_8$ | $A_9$ | $A_{10}$ | $A_{11}$ |
|  |  | 6.60294E−03 | 1.48786E−03 | 1.68364E−03 | 4.52616E−03 | 4.83603E−03 |
|  |  | $A_{12}$ |  |  |  |  |
|  |  | −4.16043E−03 |  |  |  |  |
|  | K | $A_4$ | $A_6$ | $A_8$ | $A_{10}$ |
| 16 | 1.00000 | −2.42752E−01 | −2.11133E−01 | −7.07746E−01 | 1.00116E+00 |
|  | K | $A_4$ | $A_6$ | $A_8$ | $A_{10}$ |
| 17 | 1.00000 | −1.14153E−01 | −8.63096E−02 | −4.29166E−01 | 4.52795E−01 |
|  | K | $A_3$ | $A_4$ | $A_5$ | $A_6$ |
| 26 | 1.00000 | 0.00000E+00 | −1.00809E−01 | −2.07625E−03 | 5.23353E−02 |

TABLE 10-continued

| ASPHERIC COEFFICIENT | | | |
|---|---|---|---|
| $A_7$ | $A_8$ | $A_9$ | $A_{10}$ |
| 2.09609E−05 | −1.38391E−02 | 3.36511E−03 | −9.22151E−04 |

| | K | $A_3$ | $A_4$ | $A_5$ | $A_6$ |
|---|---|---|---|---|---|
| 27 | 1.00000 | 0.00000E+00 | −9.33934E−02 | 5.27378E−03 | 4.08235E−02 |

| $A_7$ | $A_8$ | $A_9$ | $A_{10}$ |
|---|---|---|---|
| 1.13204E−02 | −9.36726E−03 | −1.63296E−02 | 9.61718E−03 |

According to the zoom lens for projection of Example 5, all of the formulas (1) through (4), (2'), (3') and (4') are satisfied, as Table 13 shows.

FIGS. 11A through 11L are diagrams illustrating aberrations of the zoom lens for projection of Example 5 at the wide angle end (wide), a middle position (middle), the telescopic end (tele). FIGS. 11A through 11L illustrate spherical aberrations, astigmatic aberrations, distortions and lateral chromatic aberrations.

As these diagrams illustrating aberration clearly show, the zoom lens for projection of Example 5 can remarkably reduce a variation in various kinds of aberrations, such as spherical aberration and astigmatic aberration, caused by zooming. Further, it is possible to correct the aberrations in an extremely efficient manner.

Example 6

Figure 6:
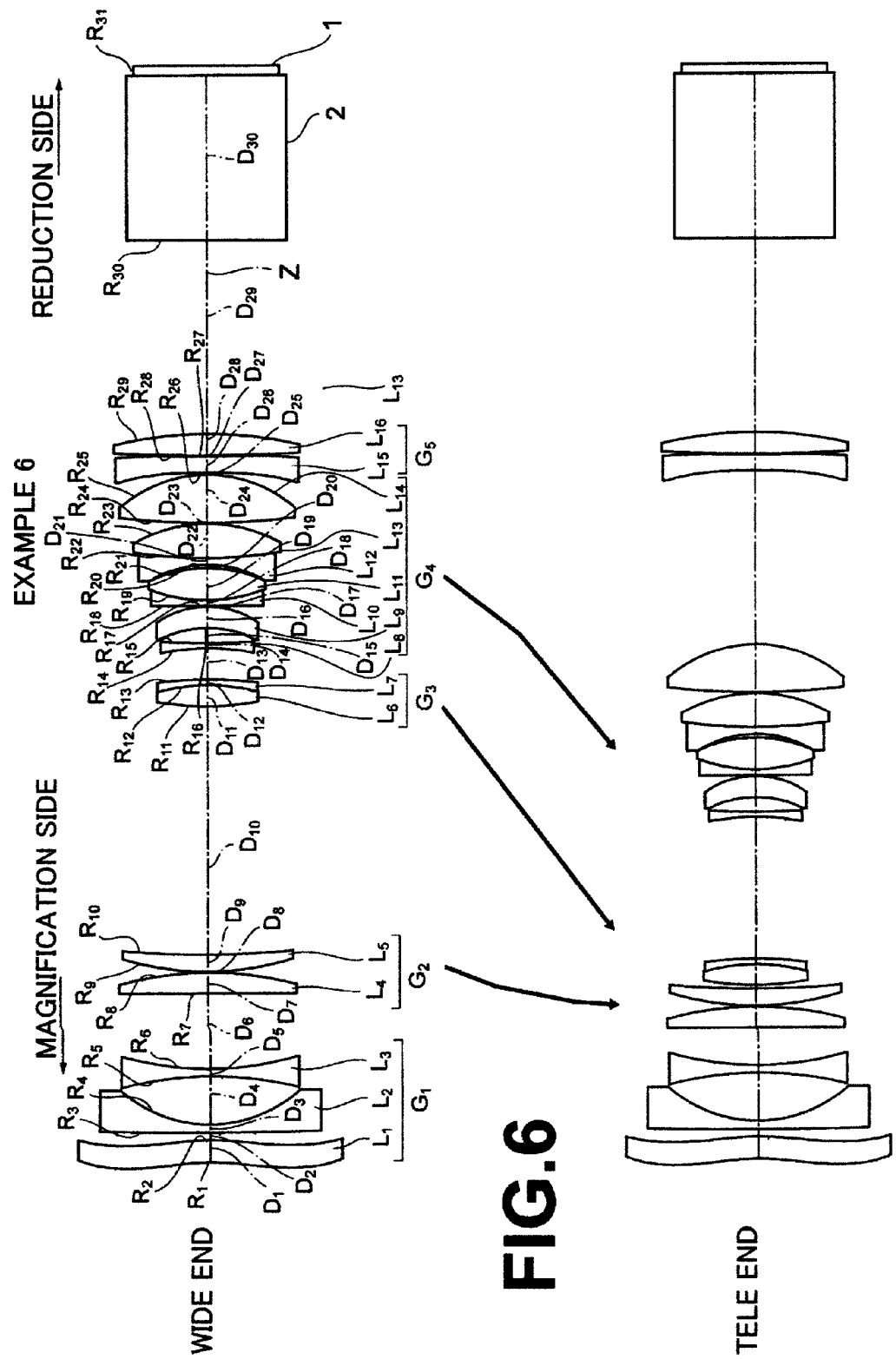
FIG. 6 is a diagram illustrating the structure of lenses in a zoom lens for projection of Example 6, and movement positions of respective lens groups at a wide angle end (wide) and a telescopic end (tele)

FIG. 6 is a diagram illustrating movement positions and movement paths of respective lens groups at a wide angle end (wide) and a telescopic end (tele) in a zoom lens for projection of Example 6.

The zoom lens for projection of Example 6 includes five lens groups in a manner basically similar to the zoom lens for projection of Example 5. However, the zoom lens for projection of Example 6 differs from the zoom lens for projection of Example 5 in that the second lens $L_2$ in the first lens group $G_1$ is a negative meniscus lens having a concave surface facing the reduction side. Further, in the zoom lens for projection of Example 6, the tenth lens $L_{10}$ in the fourth lens group $G_4$ is a negative meniscus lens having a convex surface facing the magnification side.

As illustrated in FIG. 6, in a manner substantially similar to Example 5, when the magnification is changed, the first lens group $G_1$ and the fifth lens group $G_5$ are fixed groups, and the second lens group $G_2$ through the fourth lens group $G_4$ are movable groups.

Further, the reduction side is substantially telecentric.

Table 11 shows values of curvature radius R of each lens surface of the zoom lens for projection, axial surface interval D for each lens, and refractive index N and Abbe number ν of each lens for d-line.

The lower section of Table 11 shows intervals between lens groups at a wide angle end (wide), a middle position (middle), and a telescopic end (tele). Further, Table 12 shows aspheric coefficients representing respective aspheric surfaces.

TABLE 11

FOCAL LENGTH F = 1.00~1.54~2.00

| | R | D | Nd | νd |
|---|---|---|---|---|
| 1* | −2.251 | 0.227 | 1.4910 | 57.6 |
| 2* | −2.541 | 0.076 | | |
| 3 | 36.413 | 0.087 | 1.5891 | 61.1 |
| 4 | 1.393 | 0.495 | | |
| 5 | −3.633 | 0.077 | 1.6180 | 63.3 |
| 6 | 3.254 | (MOVEMENT 1) | | |
| 7 | 334.459 | 0.215 | 1.5814 | 40.7 |
| 8 | −3.487 | 0.009 | | |
| 9 | 2.938 | 0.177 | 1.7283 | 28.5 |
| 10 | 9.538 | (MOVEMENT 2) | | |
| 11 | 2.991 | 0.212 | 1.6259 | 35.7 |
| 12 | −1.930 | 0.058 | 1.8052 | 25.4 |
| 13 | −4.048 | (MOVEMENT 3) | | |
| 14 | −2.416 | 0.052 | 1.7292 | 54.7 |
| 15 | 8.518 | 0.146 | | |
| 16* | −1.321 | 0.217 | 1.5686 | 58.6 |
| 17* | −0.983 | 0.009 | | |
| 18 | 86.810 | 0.059 | 1.8044 | 39.6 |
| 19 | 1.643 | 0.328 | 1.4388 | 94.9 |
| 20 | −1.379 | 0.035 | | |
| 21 | −1.143 | 0.070 | 1.8340 | 37.2 |
| 22 | 5.074 | 0.346 | 1.4970 | 81.5 |
| 23 | −1.551 | 0.009 | | |
| 24 | 7.698 | 0.490 | 1.4388 | 94.9 |
| 25 | −1.376 | (MOVEMENT 4) | | |
| 26* | −8.834 | 0.164 | 1.4910 | 57.6 |
| 27* | 11.569 | 0.009 | | |
| 28 | 16.803 | 0.223 | 1.8052 | 25.4 |
| 29 | −4.089 | 1.973 | | |
| 30 | ∞ | 1.691 | 1.5163 | 64.1 |
| 31 | ∞ | | | |

| MOVEMENT INTERVAL | WIDE END | MIDDLE POSITION | TELE END |
|---|---|---|---|
| MOVEMENT 1 | 0.766 | 0.401 | 0.391 |
| MOVEMENT 2 | 2.529 | 1.106 | 0.036 |
| MOVEMENT 3 | 0.320 | 1.128 | 1.440 |
| MOVEMENT 4 | 0.022 | 1.003 | 1.771 |

TABLE 12

ASPHERIC COEFFICIENT

| SURFACE NUMBER | K | $A_3$ | $A_4$ | $A_5$ | $A_6$ |
|---|---|---|---|---|---|
| 1 | −0.67166 | −2.74772E−02 | 4.23685E−01 | −2.68043E−01 | −2.77800E−02 |
| | $A_7$ | $A_8$ | $A_9$ | $A_{10}$ | $A_{11}$ |
| | 6.99783E−02 | 5.16195E−03 | −1.49718E−02 | −3.49758E−03 | 4.68938E−03 |
| | $A_{12}$ | | | | |
| | −5.73240E−04 | | | | |
| | K | $A_3$ | $A_4$ | $A_5$ | $A_6$ |
| 2 | −0.73118 | −2.21019E−02 | 3.76675E−01 | −2.29714E−01 | −1.31976E−02 |
| | $A_7$ | $A_8$ | $A_9$ | $A_{10}$ | $A_{11}$ |
| | 2.07797E−02 | 1.27402E−02 | 2.29543E−04 | −3.01162E−03 | 3.42322E−04 |
| | $A_{12}$ | | | | |
| | −1.90667E−05 | | | | |
| | K | $A_4$ | $A_6$ | $A_8$ | $A_{10}$ |
| 16 | 1.00000 | −3.17938E−01 | −3.28441E−01 | −9.01064E−01 | 1.68989E+00 |
| | K | $A_4$ | $A_6$ | $A_8$ | $A_{10}$ |
| 17 | 1.00000 | −1.46904E−01 | −1.29239E−01 | −4.67603E−01 | 7.43656E−01 |
| | K | $A_3$ | $A_4$ | $A_5$ | $A_6$ |
| 26 | 1.00000 | 0.00000E+00 | −1.11954E−01 | 5.11300E−03 | 4.39253E−02 |
| | $A_7$ | $A_8$ | $A_9$ | $A_{10}$ | |
| | −2.77527E−03 | −1.19212E−02 | 2.03275E−02 | −1.37522E−02 | |
| | K | $A_3$ | $A_4$ | $A_5$ | $A_6$ |
| 27 | 1.00000 | 0.00000E+00 | −1.07230E−01 | 1.19766E−02 | 3.58815E−02 |
| | $A_7$ | $A_8$ | $A_9$ | $A_{10}$ | |
| | 4.68661E−03 | −3.28331E−04 | −1.00365E−02 | 2.32010E−03 | |

According to the zoom lens for projection of Example 6, all of the formulas (1) through (4), (2'), (3') and (4') are satisfied, as Table 13 shows.

FIGS. 12A through 12L are diagrams illustrating aberrations of the zoom lens for projection of Example 6 at the wide angle end (wide), a middle position (middle), the telescopic end (tele). FIGS. 12A through 12L illustrate spherical aberrations, astigmatic aberrations, distortions and lateral chromatic aberrations.

As these diagrams illustrating aberration clearly show, the zoom lens for projection of Example 6 can remarkably reduce a variation in various kinds of aberrations, such as spherical aberration and astigmatic aberration, caused by zooming. Further, it is possible to correct the aberrations in an extremely efficient manner.

TABLE 13

| | (1) νa | (2) dn/dt | (3) Σ (1/fa) × fw | (4) fas/fw |
|---|---|---|---|---|
| EXAMPLE 1 | 81.5 | −6.2 × 10^−6 | 0.98 | −17.00 |
| EXAMPLE 2 | 81.5 | −6.2 × 10^−6 | 0.92 | −13.33 |
| EXAMPLE 3 | 81.5 | −6.2 × 10^−6 | 0.95 | −10.17 |

TABLE 13-continued

| | (1) νa | (2) dn/dt | (3) Σ (1/fa) × fw | (4) fas/fw |
|---|---|---|---|---|
| EXAMPLE 4 | 81.5 | −6.2 × 10^−6 | 0.96 | −39.15 |
| EXAMPLE 5 | 81.5 | −6.2 × 10^−6 | 0.99 | −9.99 |
| EXAMPLE 6 | 94.9 | −6.7 × 10^−6 | 0.93 | −10.17 |

The zoom lens for projection according to the present invention is not limited to the zoom lenses of the aforementioned examples, and various modifications are possible. For example, the curvature radius R of each lens and the axial surface interval D may be changed in an appropriate manner.

Further, the configuration of the projection-type display device according to the present invention is not limited to the aforementioned configuration. The projection-type display device of the present invention may be configured in various manners including the zoom lens for projection of the present invention. For example, as the light bulb, a transmission-type or reflection-type liquid crystal display device, or a micro-mirror device (for example, a digital micromirror device (DMD) produced by Texas Instruments Incorporated) may be used. In the micromirror device, a multiplicity of micromirrors, the direction of each of which is changeable, are arranged on a substantially flat surface. Further, an illumination optical system that has an appropriate structure corresponding to the kind of the light bulb may be adopted.

What is claimed is:

1. A zoom lens for projection comprising:
a lens group having a negative refractive power that is arranged farthest to a magnification side of the zoom lens;
a lens group having a positive refractive power that is arranged farthest to a reduction side of the zoom lens; and
at least one lens group that is arranged between the lens groups, and moves when the magnification of the zoom lens is changed,
wherein the reduction side of the zoom lens forms a telecentric system, and
wherein the lens group that is arranged farthest to the reduction side is fixed when the magnification of the zoom lens is changed, and is composed of a negative aspheric lens made of a plastic material having at least one aspheric surface and a positive lens, and
wherein at least one positive lens arranged on the reduction side of a lens having the smallest effective diameter among lenses composing the zoom lens satisfies the following formula (1):

$$va>80 (\text{here}, (dn/dt)<0) \tag{1},$$

where va: Abbe number of the at least one positive lens arranged on the reduction side of the lens having the smallest effective diameter among lenses composing the zoom lens for d-line, and
dn/dt: a change in the refractive index of the material forming the at least one positive lens arranged on the reduction side of the lens having the smallest effective diameter among lenses composing the zoom lens for d-line when temperature changes from 20° C.

2. A zoom lens, as defined in claim 1, wherein the at least one positive lens satisfying the formula (1) further satisfies the following formula (2):

$$(dn/dt) < -4.0 \times 10^{-6} \tag{2}.$$

3. A zoom lens for projection, as defined in claim 1, wherein the following formula (3) is satisfied:

$$\Sigma(1/fa) \times fw \leq 1.2 \tag{3},$$

where fa: the focal length of the at least one positive lens satisfying the formula (1), and
fw: the focal length of the entire system of the zoom lens at a wide angle end.

4. A zoom lens for projection, as defined in claim 1, wherein the following formula (4) is satisfied:

$$fas/fw \leq -5.0 \tag{4},$$

where fas: the focal length of the negative aspheric lens made of the plastic material.

5. A zoom lens for projection, as defined in claim 1, wherein a lens group arranged second farthest to the reduction side of the zoom lens includes at least one lens satisfying the formula (1).

6. A zoom lens for projection, as defined in claim 1, wherein a first lens group having a negative refractive power, a second lens group having a positive refractive power, a third lens group having a positive refractive power, a fourth lens group having a negative refractive power, a fifth lens group having a positive refractive power, and a sixth lens group having a positive refractive power are sequentially arranged from the magnification side, and wherein the second lens group, the third lens group, the fourth lens group, and the fifth lens group of the six lens groups are movable when the magnification of the zoom lens is changed.

7. A zoom lens for projection, as defined in claim 1, wherein a first lens group having a negative refractive power, a second lens group having a positive refractive power, a third lens group having a positive refractive power, a fourth lens group having a positive refractive power, and a fifth lens group having a positive refractive power are sequentially arranged from the magnification side, and wherein the second lens group, the third lens group, and the fourth lens group of the five lens groups are movable when the magnification of the zoom lens is changed.

8. A projection-type display device comprising:
a light source;
a light bulb;
an illumination optical unit that guides a light beam output from the light source to the light bulb; and
a zoom lens for projection, as defined in claim 1, the reduction side of the zoom lens being telecentric, wherein the light beam output from the light source is modulated by the light bulb, and projected onto a screen by the zoom lens for projection.

* * * * *